United States Patent [19]

Lee et al.

[11] Patent Number: 5,339,399
[45] Date of Patent: Aug. 16, 1994

[54] CACHE CONTROLLER THAT ALTERNATELY SELECTS FOR PRESENTATION TO A TAG RAM A CURRENT ADDRESS LATCH AND A NEXT ADDRESS LATCH WHICH HOLD ADDRESSES CAPTURED ON AN INPUT BUS

[75] Inventors: Yong Lee, Santa Clara; Nagraj Palasamudram; James Nadir, both of San Jose, all of Calif.

[73] Assignee: Intel Corporation, Santa Clara, Calif.

[21] Appl. No.: 684,180

[22] Filed: Apr. 12, 1991

[51] Int. Cl.⁵ .............................................. G06F 13/14
[52] U.S. Cl. .............................................. 395/425
[58] Field of Search ........................... 395/400, 425; 365/230.02, 230.08; 364/200 MS, 900 MS

[56] References Cited
U.S. PATENT DOCUMENTS 4,716,545 12/1987 Whipple et al. ............... 395/425
4,982,402 1/1991 Beaven et al. ............... 364/DIG. 1
5,107,462 4/1992 Grundmann et al. ........... 365/189.05

Primary Examiner—David L. Robertson
Attorney, Agent, or Firm—Owen L. Lamb

[57] ABSTRACT

A cache controller sits in parallel with a microprocessor bus and includes a tag RAM for associatively searching a directory for cache data-array addresses. Two normal address latches are provided to capture a cycle address in case the current cycle is extended by a pending tag RAM access. At any time, except when the next cycle has started, but during which the current cycle is in progress, one latch is open to an input buffer such that the input address is latched by that latch. The other latch holds the current cycle address until the cycle ends. The current cycle can be extended with snoops. The current cycle address has to be maintained as long as the cycle is still in progress. In the meantime, the external cycle might have ended and a next cycle started. The second address latch is used to capture the address corresponding to this new cycle. As signal selects which of the two latches will supply the address via a MUX to the tag RAM. Logic switches the two input address latches so that the tag RAM sees a constant address for the duration of a cycle while at the same time a new cycle address can be received.

4 Claims, 9 Drawing Sheets

CACHE CONTROLLER THAT ALTERNATELY SELECTS FOR PRESENTATION TO A TAG RAM A CURRENT ADDRESS LATCH AND A NEXT ADDRESS LATCH WHICH HOLD ADDRESSES CAPTURED ON AN INPUT BUS

CROSS-REFERENCE TO RELATED APPLICATION

This application is related to U.S. Pat. No. 5,210,845, of John H. Crawford, et al., entitled "Controller for Two-way Set Associative Cache", granted on May 11, 1993 and assigned to Intel Corporation, the assignee of the present invention.

1. Technical Field

The present invention relates to data processing systems and more particularly, to a method and means for managing complex timing cycles in a controller for a data cache.

2. Background Art

A cache is a relatively high-speed, small, local memory which is used to provide a local storage for frequently accessed memory locations of a larger, relatively slow, main memory. By storing the information or a copy of the information locally, the cache is able to intercept memory references and handle them directly without transferring the request to the main memory over the system bus. The result is lower traffic on the memory bus and decreased latency on the CPU bus to the requesting processor.

The most powerful microprocessor now used in IBM compatible personal computers is the Intel 80486 which uses an internal cache with its own internal cache controller to satisfy the increasing demands of application programs for more memory and faster operating speeds. The purpose of the internal cache is to reduce the number of times the CPU has to interface with external memory subsystems for its instructions and data.

In order to further reduce the access time when the data/instruction is not in the internal cache, a second-level cache is often used in addition to the internal or first level cache in the microprocessor CPU. A second-level cache is external to the 80486 CPU, but supports much faster access times than the main memory.

As their needs expand, users may also want to add on more memory, so it is also advantageous to have a single external second-level cache controller in addition to the internal first-level cache controller that can map to a very large address space or alternatively to a smaller address space, depending upon the configuration of memory modules in the system.

The above-referenced U.S. Pat. No. 5,210,845 discloses such a second-level cache controller which sits in parallel with a microprocessor bus so as not to impede system response in the event of a cache miss. The second-level cache controller has a tag RAM which is configured into two ways, each way including tag and valid-bit storage for associatively searching the directory for cache data-array addresses. The external second-level cache controller sits in parallel with the microprocessor bus so as to not impede system response in the event of a second-level cache miss. The second-level cache controller is configured into a plurality of ways, each way including tag and valid-bit storage for associatively searching the directory for cache data-array addresses. Both the second-level cache and the main memory can simultaneously begin to look up the access address. In the event of a second-level cache hit, the data/instruction is supplied by the second-level cache with zero wait-state. In the event of a second-level cache-miss, the parallel look-up technique incurs no additional penalty.

Output enable activation time is very critical to synchronizing the external cache with the 80486 operating at 33 MHz. As soon as a cycle starts by presenting an address to the tag RAM, the time that the tag RAM needs in order to signal that the address is a hit or a miss is almost half into the next clock period.

It is therefore an object of the present invention to provide a method and means for managing complex timing cycles in a controller for a data cache.

Briefly, the above object is accomplished in accordance with the invention by providing a cache controller that responds to an address on a input address bus portion of a CPU bus. A cache data-array is connected to the cache controller and to the CPU bus. The cache controller controls access to a cache data-array via a tag RAM. Control logic is provided in the cache controller for controlling references to the cache data-array and comprises a first address latch, a second address latch and a clocking means. The clocking means includes a first clock signal for capturing a current address on the input address bus into one of either the first or second address latches at the beginning of a current cycle. The clocking means further includes a second clock signal for capturing a next address on the input address bus into the other one of the address latches at the beginning of a next cycle, the other of the latches holding the current address until the current cycle ends. Means are provided for alternately selecting one of the first and second latches on successive cycles of the clocking means to receive an input address at the successive clock cycles. A MUX controls which of the two address latches is gated to the tag RAM.

In accordance with an aspect of the invention, a snoop cycle signal line is provided for signaling that a snoop address is on the input address bus. A first snoop latch connected to the input address bus and responsive to the snoop cycle signal line stores the snoop address. A second snoop latch connected to the first snoop latch is provided. A third clock signal is provided for capturing the contents of the first snoop latch into the second snoop latch to thereby extend the time that the snoop address is available at the input to the tag RAM. The MUX further includes means for controlling which of the three address latches is gated to the tag RAM.

BRIEF DESCRIPTION OF THE DRAWINGS

The invention will be apparent from the following, more particular description of the preferred embodiment of the invention as illustrated in the accompanying drawings, wherein.

DESCRIPTION OF THE PREFERRED EMBODIMENT

Figure 1:
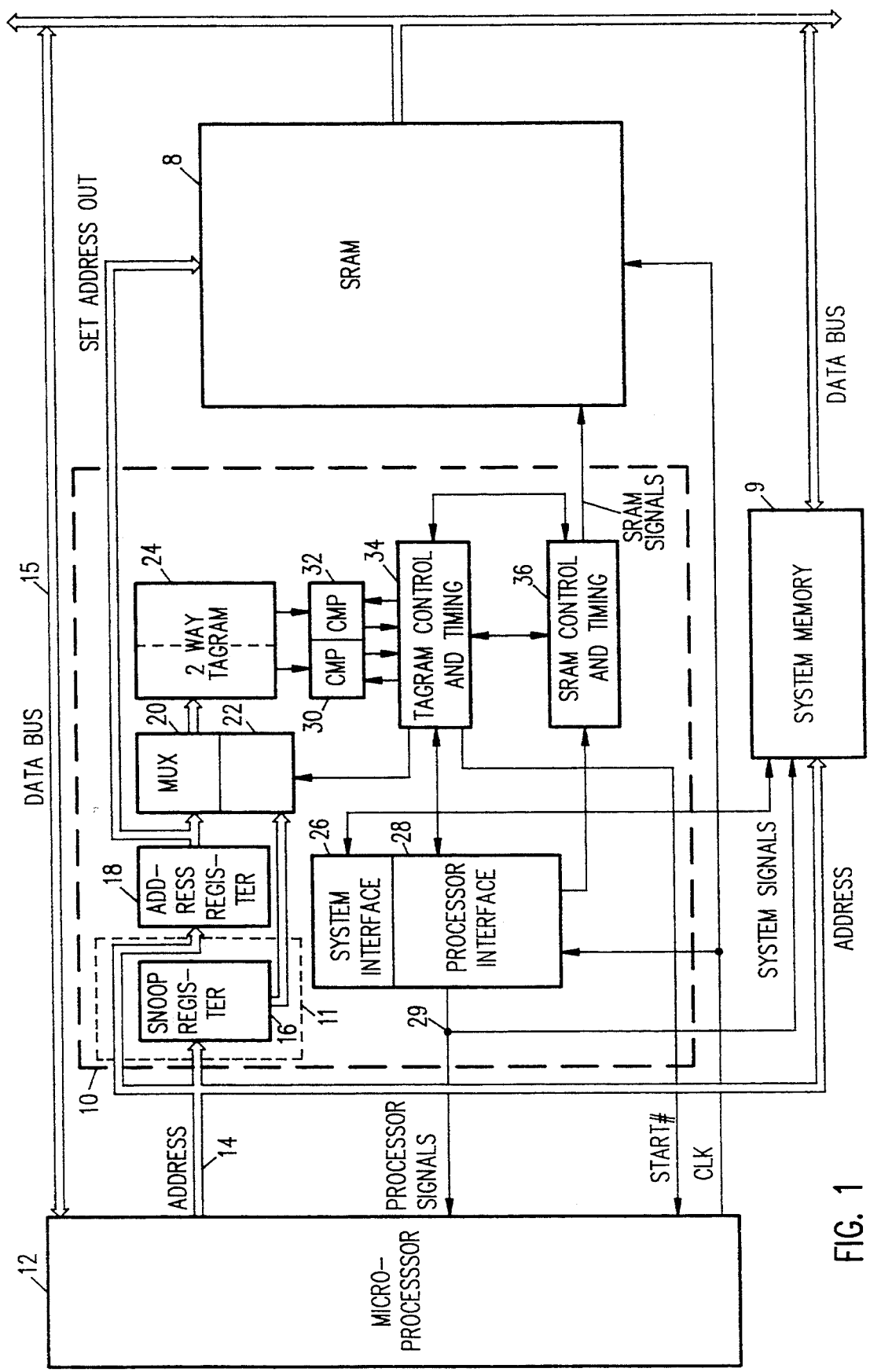
FIG. 1 is a block diagram of a data processing system in which the invention is embodied.

Refer now to FIG. 1 which is a block diagram of the data processing system described in U.S. Pat. No. 5,210,845 and in which the present invention is embodied. The cache module (10) is a second level, single-ported, optional, add-on cache controller for a microprocessor (12), such as the Intel 80486. It monitors CPU address bus (14) activity to determine when it needs to search its internal tag RAM directory (24). The cache module directly interfaces to the microprocessor via processor interface (28).

The data cache (8) is a static random access memory (SRAM) and is external to the cache controller. The cache controller buffers the data cache's addresses in a snoop register (16) and address register (18) and supplies all other data cache control to support no wait state processor operation when there is a cache hit. As described in U.S. Pat. No. 5,210,845 a signal called Burst Last (BLAST#) is output by the CPU and is sampled by the cache module to determine when the end of a cycle occurs. BLAST# determines the length of a dword transfer. Another signal called backoff (BOFF#) is a CPU signal sampled by the cache module to indicate that a cycle be immediately terminated. If BOFF# is sampled active, the module will float its data bus. The module will ignore all cycles, except invalidation cycles, until BOFF# is deactivated. The cache module has provisions to support Snoop cycles, Back Off, and premature BLAST terminations. Internally, the cache controller maintains the TAG address and Status of each data cache line.

Figure 2:
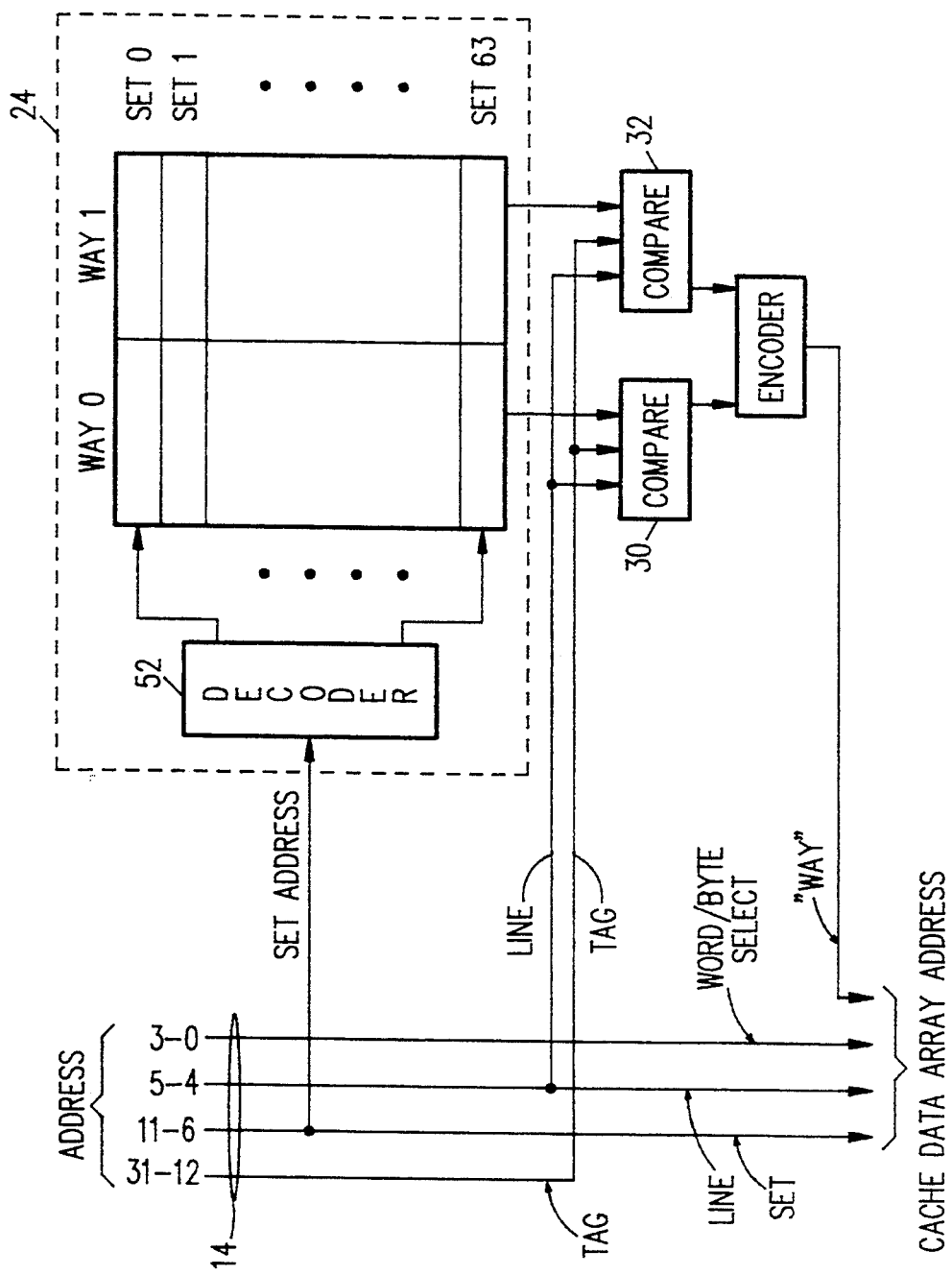
FIG. 2 is a block diagram the of the cache module (10) shown in FIG. 1.

Refer to FIG. 2. The function of the directory (24) is to store addresses which correspond to data which are stored in the cache memory. The directory (24) is configured into two ways (WAY0, WAY1). A line is the basic unit of data transferred between the cache and the main memory. It consists of 16 bytes of data. A line is also known as a transfer block. If the data corresponding to a particular address (14) is stored in the cache, the cache can supply the data, thus avoiding a main memory access. This is referred to as a "cache hit." The decision, hit or miss, is determined on a per line basis. An address block is the basic unit of cache addressing. Each address block describes the physical address of one of two contiguous lines of data.

There is a valid bit stored in the directory (24) associated with each line within an address block. If the line is present in the cache, then the valid bit is turned on. The address information held in the cache directory is referred to as a tag. Since many addresses map to a single address block, the tag information is used to identify the exact memory locations that are currently associated with an address block. A hit occurs when the tag of an address block matches the bus address and the desired line valid bit is on.

Each way provides storage for the tag and valid bits. Multiple simultaneous comparisons are made in the compare circuits (30, 32) between the bus address (14) and the tag fields in the ways to determine if the data is in the cache data array. A set is a grouping of address blocks consisting of one address block from each way. All of the address blocks in a set are simultaneously selected when a portion of the CPU bus address is decoded into a set address by the decoder (52).

When a new block of data needs to be pulled into the cache, it may be necessary to remove an old block of data that is already in the cache to make room for the new data. There is a sequence for determining which way gets replaced when a new address is needed in an address block.

When a write transaction on the CPU bus involves an address which is not in the cache (a cache miss), no attempt is made to store the corresponding data in the cache. However, when a write transaction on the CPU bus involves an address which is in the cache (a cache hit), the directory uses a write-through policy. This means that CPU bus-writes that result in a cache hit are written into the cache as well as main memory. This ensures that main memory always holds a valid copy of all data locations.

DESCRIPTION OF THE PREFERRED EMBODIMENT

In the data processing system shown in FIG. 1 an input address bus (14) is connected to a cache controller (10) and the system memory (9). A cache data-array (SRAM-8) is connected to the cache controller and to the input address bus. The present invention is embodied in a control logic, shown within the broken lines (11), in the cache controller which controls references to the cache data-array (8). The control logic (11) is shown in more detail in FIG. 15.

Figure 15:
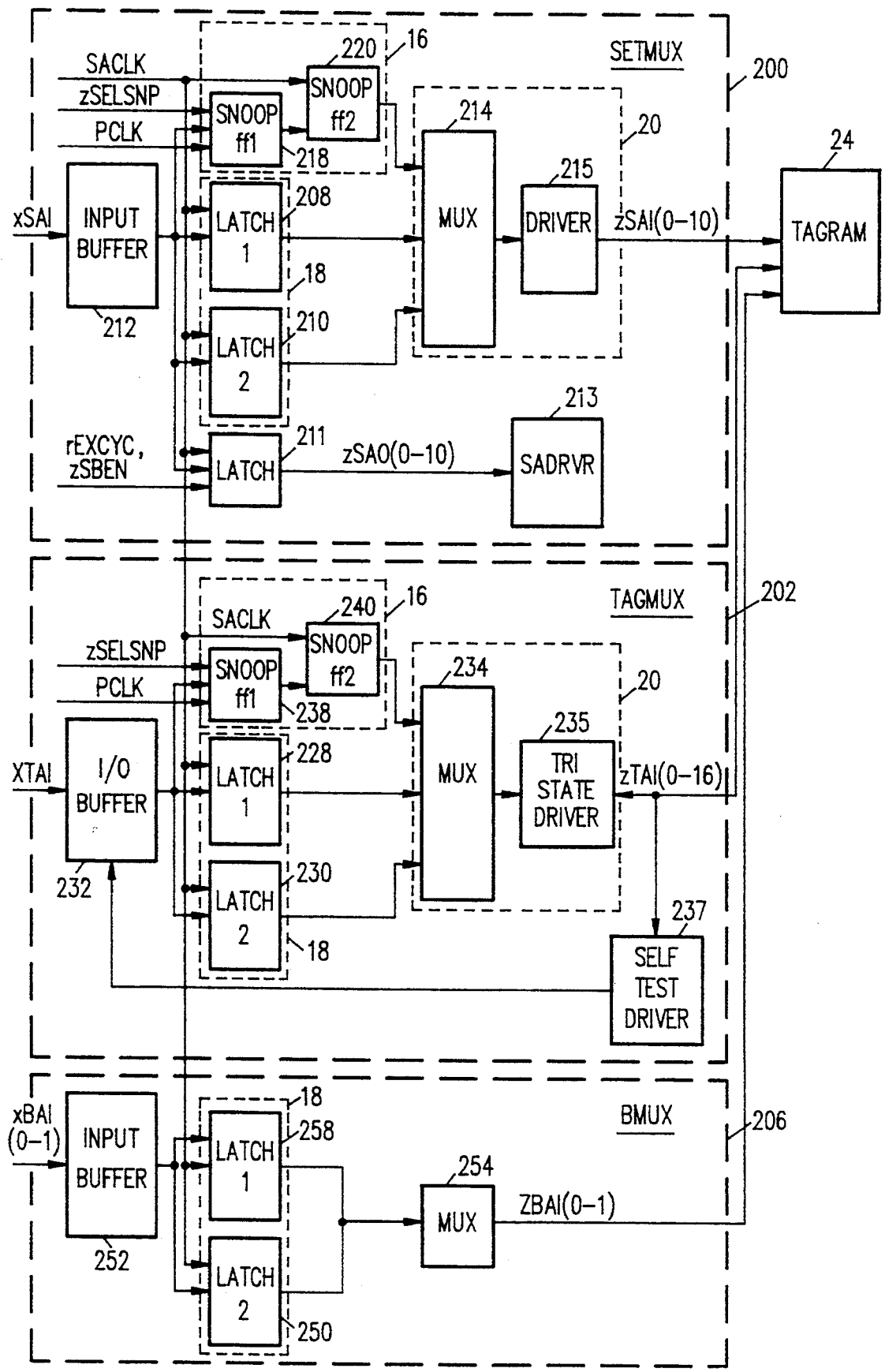
FIG. 15 is a logic diagram of the input MUX.

Refer to FIG. 15. The control logic comprises a set MUX (200) for handling the set portion of the bus address, a TAGMUX for handling the tag portion of the bus address, and a BMUX for handling the line portion of the bus address. Consider the SETMUX (200) portion. The TAGMUX and BMUX operate in a similar manner.

A first address latch (208) is connected to the input address bus (xSAI). A second address latch (210) is also connected to the input address bus (xSAI). A clocking circuit is provided for generating a first clock signal and a second clock signal on the SACLK line. A first logic connected to the SACLK line, responds to the first clock signal and captures a current address on the input address bus into one of either the first address latch (208) or the second address latch (210) at the beginning of a current cycle.

A second logic, connected to the SACLK line, responds to the second clock signal and captures a next address on the input address bus into the other one of the first and second address latches at the beginning of a next cycle. The other one of the latches holds the next address until the current cycle ends. The latches are alternately selected on successive cycles of the clocking means to thereby receive an input address at each successive clock cycle.

Snoop cycles are handled as follows. A snoop cycle signal line (zSELANP) signals that a snoop address is on the address bus. A first snoop latch (218) is connected to the input address bus and responds to the snoop cycle signal line to store the snoop address.

A second snoop latch (220) is connected to the first snoop latch (218). The clock generates a third clock signal which transfers the snoop address in the first snoop latch (218) to the second snoop latch (220).

A multiplexer (MUX-214) is connected to the latches (208, 210 and 220) and to the clocking means. The MUX (214) gates one of the current address, the next address, or the snoop address to the driver (215) control logic which produces the output zSAI (0-10), the set address to TAGRAM (24).

DETAILED DESCRIPTION

Pin signals for the module (10) are described U.S. Pat. No. 5,210,845. They include:
Control Signals, CLK, RESET, ADS#, M/IO#, W/R#, START#, BRDYO#, CBRDY#, CRDY#, BLAST#, BOFF#, and PRSN#,
Address Signals A2–A31, BE0#–BE3#, and CS#,
Data Signals D0–D31, DP0–DP3,
Cacheability Signals CKEN#, SKEN#, FLUSH#, WP, WPSTRP#, and EADS#.

FIG. 2 shows the internal structure of the 2 way tag RAM (24) shown in FIG. 1. The module is divided into three blocks, RLS (50), the tag RAM (52) and the BISC or Bus Interface and Special Circuits (54). There are numerous signals interconnecting the various logic blocks which are shown as interconnecting buses in FIG. 2. These signals are described subsequently in a section entitled "Signal Descriptions".

Functional Description

There are five types of cycles that occur, four normal cycles and a snoop cycle:
1. Read Miss (line fill)
2. Read Hit
3. Write Miss
4. Write Hit
5. Snoop

Normal cycles

A cycle starts with zADSCYC. Under normal circumstances, zADSCYC follows yADSnn. However, if the logic is still in a cycle (zINCYC active), due to pending requests to the tag RAM, then yADSnn will trigger zADSWAIT which in turn will trigger zADSCYC as soon as the cycle ends (zINCYC inactive). Also, snoop during idle bus is considered as a cycle starter. Here the cycle will last exactly two clocks.

A cycle ends when any of the following three conditions are met:
1. RESET
2. BLAST# with BRDY#, RDY# or BRDYO#
3. BOFF#

A cycle is tracked in two ways. The external cycle, the cycle as seen by an external driver, is tracked with rEXCYC. The internal cycle, the cycle as dictated by the tag RAM access, is tracked with zINCYC. As long as the chip is in an internal cycle, with zINCYC active, another external cycle will be kept pending.

Snoop Cycles

In a multiprocessor environment there may be more than one processor sharing the same memory space. Suppose the data are stored in the cache of one processor and the other processor goes to external memory for the same data. If the second processor changes the data, then the data in the first processor's cache would be corrupted. The snoop signal is sent to every processor and monitored by each processor. If any processor has a private copy of the data at the address of the line indicated by the snoop signal, then it must go into its cache and invalidate that line.

There is an address on the bus associated with the snoop signal. Therefore, if there is an address on the bus and the snoop signal is raised, then the processor must go in and invalidate that local private copy of the data. The snoop cycles are independently handled and they can be overlaid with the other four cycles, termed the normal cycles. When a snoop occurs during a normal cycle, then the cycle may get extended depending on where in the cycle the snoop occurs and whether the snoop was a hit or miss, or whether or not the normal cycle and the snoop are competing to access the tag RAM. When a cycle is extended, the processing of the next cycle may be delayed.

Figure 14:
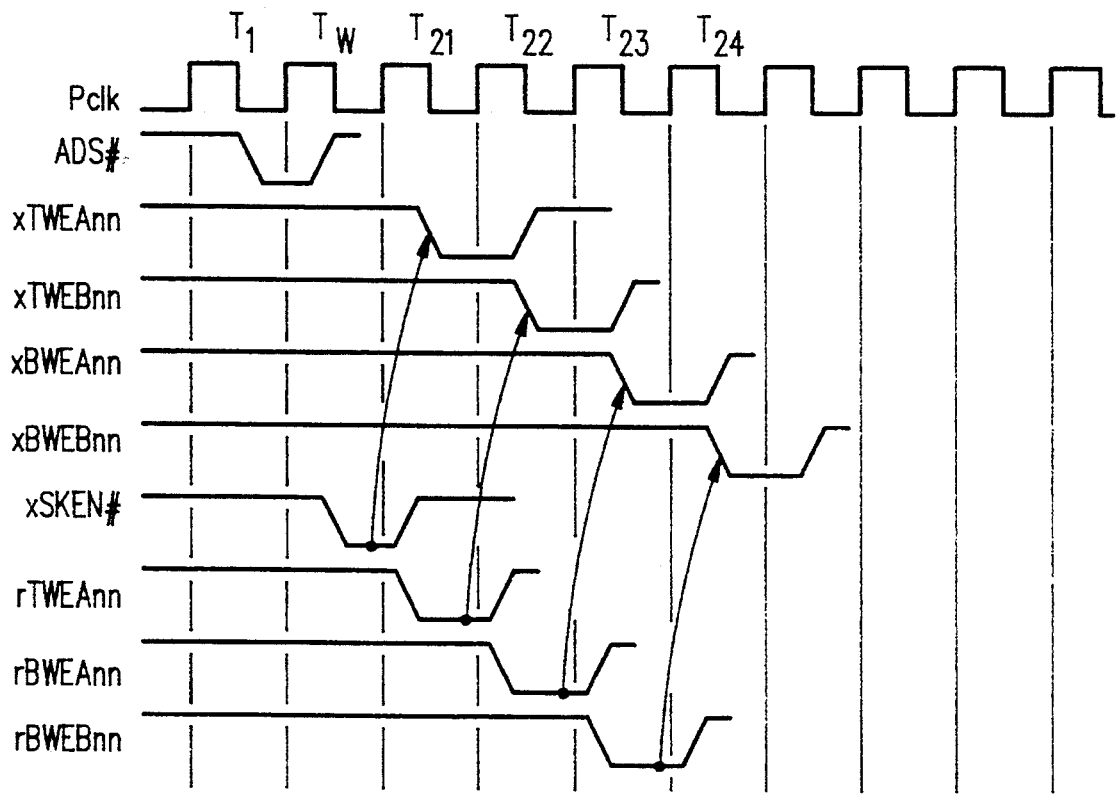
FIG. 14 is a timing diagram of the generation of write enable.

In a conventional cache, the data that the processor looks at can come from two different places. One is from the cache itself, and the other is from external memory. If the data comes from the cache, this is called a hit. If it comes from memory, then the cache did not have it, and this is a miss for the cache. Once the data is in the cache, then the processor will obtain the data from the cache every time. The snoop cycle must be done in parallel with the normal cycle of the processor. For example, if a processor is in the process of getting data from address A1 from its cache and a snoop signal is raised to address A2, then the snoop logic has to go back and check the tag RAM for address A2 and invalidate the A2 address if it has invalid data, but in parallel it has to continue supporting the data transfer with respect to address A1. This parallel mechanism is necessary so as not to cut the performance of the system. In order to do this, there is a buffering mechanism for buffering that address. The buffering scheme pipelines both the processor cycle address and the snoop address and then multiplexes the appropriate address into the tag RAM. The tag RAM has to utilize both the snoop and the normal cycle. This is shown in FIG. 14.

Both a snoop cycle and a normal cycle have to have access to the tag RAM. There is a priority mechanism that permits the snoop cycle to always go in first. The mechanism does not penalize the normal cycle and the priority is done in a transparent way. The cycle is complete when all of the data has been transferred to the SRAM. Then the logic goes back into the tag RAM and marks the line valid to indicate that there is valid data. During that time the logic goes into the line and places a one in the appropriate valid bit position. If during that time a snoop cycle is initiated, since snoop cycle has priority, the request that has validated the line it is kept pending. The request is placed in a queue which has a request/acknowledgment handshake protocol which does not exist for a snoop cycle. The snoop does not use a request/acknowledgment protocol, but goes directly into the tag RAM. If the tag RAM is busy servicing a snoop, then the handshake protocol between the tag RAM and the normal cycle logic handles all requests for a normal cycle. Snoop cycles inject internal wait states through a mechanism which does not acknowledge commands to the random-control section of the cache controller. Snoop-cycle management is performed separately from processor-cycle management which frees-up and simplifies the internal state machine of the cache controller.

Snoops are triggered with EADS#. zSNP is its latched version. If chip-select (zCSnn) is present, then at the following SACLK, zSNPCYC is created. In addition, zSELSNP is generated, which will cause the snoop address to be sent to the tag RAM. In the next SHCLK, the tag RAM outputs, tH[LR], tV[LR][01] are examined for a hit. The tag RAM outputs are kept in a set of snoop latches for one SHCLK period to produce zSNPHR and internal hit signals. If there is a snoop hit, then zSNPWAIT is generated that will ensure that the only access in that clock to the tag RAM will be for the snoop invalidation. All other requests to the tag RAM will be kept pending. zINCYC will be automatically extended for two clocks from the clock at which EADS# is active. Due to the two clock look-up and invalidation sequence, snoops can be supported only at every other clock. A snoop hit will automatically force the LRU bit to point to the selected way. The way is selected with zWAYSEL.

Self-Snoop

The snoop address in a self-snoop is the same as the current cycle address. The snoop address is captured at a PCLK and then transferred to a SACLK latch which in turn feeds the input address mux. The current cycle address is compared with the snoop address held in the PCLK latch to produce three match signals, zLSMATCH, zTMATCH and zSMATCH. They indicate if the corresponding line-select, tag, or set address bits match. If a self-snoop occurs with or after first transfer in a line-fill, then the line will be left invalidated. A self-snoop on a hit cycle will not affect the cycle behavior unless the EADS# occurs along with ADS#. When EADS# and ADS# occur together, the cycle will be a miss cycle. If the tag RAM returns a hit in response to the ADS#, the hit information will be ignored. zLNFIL indicates such a condition. The same condition is also locally computed at several circuits for speed reasons. EADS# with ADS# does not affect a miss cycle.

Tag RAM Inputs and Outputs

The tag RAM receives its inputs at a SACLK, and performs its function before the subsequent SHCLK. If the tag write commands are active during the access window, then it will update the selected location in addition to generating the proper outputs. The outputs indicate if the tags and the valid bits matched or missed. The LRU bit and the write-protect bit form the remaining outputs. In order for the tag RAM to do a look-up, it must be enabled with zADDECnn. zADDECnn is active whenever the chip is in a cycle with an active zINCYC.

Address Mux

Referring now to FIG. 15, for each of the logic blocks SETMUX (200), TAGMUX (202) and BMUX (204), there are three sets of input address latches: two for normal cycles and one for snoop cycles. The SAI, TAI, BAI, and LS bits are captured through the muxing logic. Two normal cycle address latches are provided in case the current cycle is extended by a pending tag access.

Referring to the SETMUX logic (200), there are two latches (208, 210) to capture the cycle address. At any time, except when the next cycle has started, but during which the current cycle is in progress, one latch is open to the input buffer (212), in the sense that at every SACLK, the input address is latched by that latch. The other latch holds the current cycle address until the cycle ends. rLATSEL selects the latch that will remain exposed to the input buffer (212). The reason for having two address latches is as follows. The current cycle can be extended with snoops. The current cycle address has to be maintained as long as the cycle is still in progress. In the meantime, the external cycle (monitored by rEXCYC), might have ended and a new one started. The second address latch is used to capture the address corresponding to this new cycle.

rLATSEL switches when the current cycle ends (when zINCYC becomes inactive). rLATSEL controls which of the two input latches (208, 210) will receive xSAI at the next SACLK. zLATSW indirectly selects which of the two latches will supply the address via the MUX (214) to the tag RAM (216).

Figure 16:
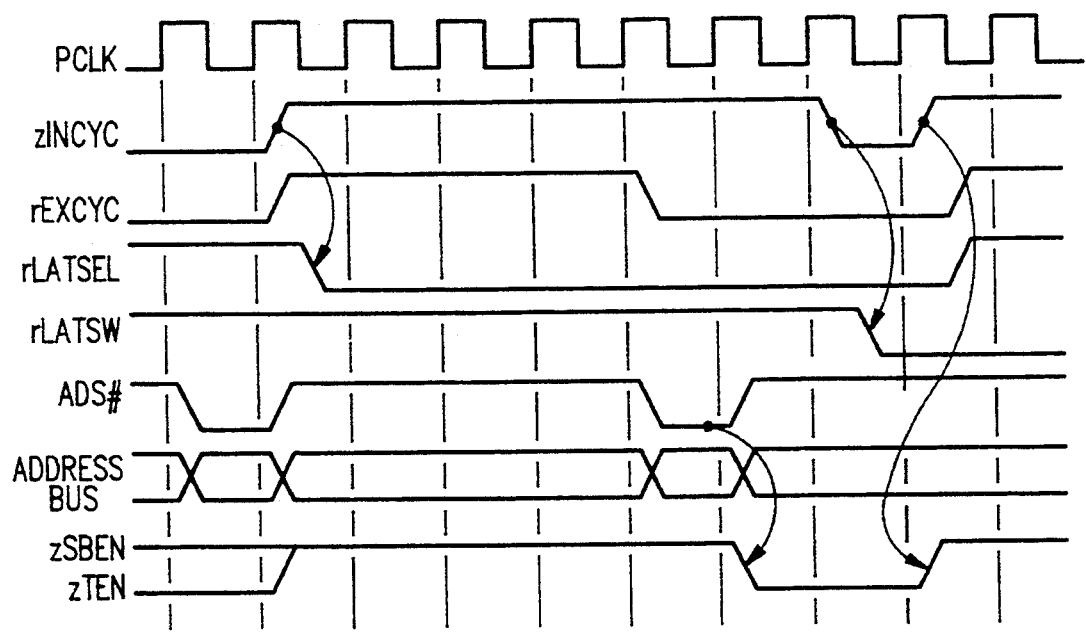
FIG. 16 is a timing diagram of the operation of the input MUX shown in FIG. 15.

FIG. 16 shows the timing of various signals that control the input mux. In FIG. 16, rLATSEL toggles as the cycle starts, opening up the other latch to the input buffer. zLATSW continues to supply the tag RAM from the current latch. zLATSW will switch to the other latch as the cycle ends signalled by zINCYC going inactive. zSBEN and zTEN are control signals which decide if the latch selected by rLATSEL will receive the external address at the next SACLK. If the current cycle is still in progress, and the next cycle begins, then zSBEN and zTEN turn off the latch to which rLATSEL points until the logic reacts to the address ADS#.

zLATSW is used in conjunction with rLATSEL to switch the two input address latches so that the tag RAM sees a constant address for the duration of a cycle while at the same time a new cycle address can be received. zLATSW does not directly control the mux (214), but creates two signals, zSELTSL1 and zSELTSL2, which do.

zLS is the latched version of yLS. A two-latch muxing scheme similar to that shown in FIG. 15 is used to capture yLS selects the sector to operate on during snoops and normal cycles. All circuits make sure that when a snoop cycle asserts zLS, its state is properly restored after snoop processing is done.

During a line fill, the RLS must know if the current line has been subjected to a snoop cycle before generating validation requests to the tag RAM. Match signals (zLSMATCH, zSMATCH, zTMATCH) are asserted when the corresponding address bits between the snoop and the cycle addresses match. The comparison is done between the contents of the cycle address latch (208 or 210) selected by zLATSW and that of the first snoop latch (218).

zSAI[0-10] are the set address outputs of the input mux (214). The polarity of zSAI is opposite of xSAI. zLATSW selects which one of the two address latches (208 or 210) will generate zSAI during normal cycles. During a snoop cycle, zSELSNP will select the snoop latch (220) to generate zSAI. zSAO[0-10] provide load isolation for the set address inputs. zSAO are meant for the module SRAMs only. The zSAO latch is enabled by rEXCYC so that the address outputs remain constant as long as the bus master is running a cycle. zSBEN serves as an additional enable signal so that if a new cycle starts while the current cycle is still in progress, the SAO latch does not lose the new cycle address due to AHOLD.

The zSELTSL1, zSELTSL2 signals select one of the two input address latches (208 or 210) during a cycle. They are derived from zLATSW. During a snoop cycle, they get overridden by zSELSNP.

Figure 18:
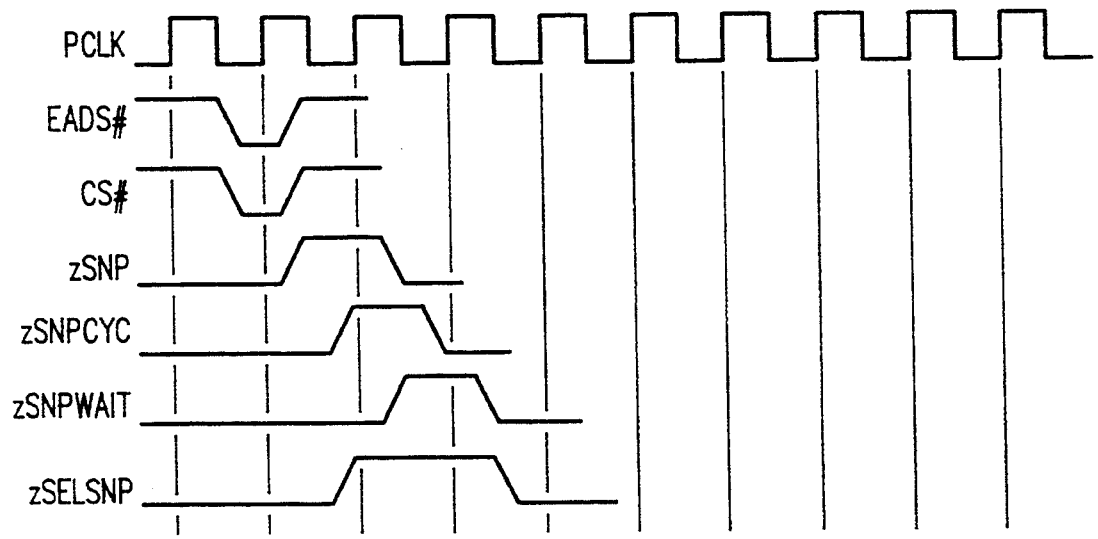
FIG. 18 is a timing diagram of the generation of snoop hit cycle.

If a snoop is chip-selected, then zSNPCYC is generated in the following SACLK and lasts one full clock. It enables the input-address mux (214) to let the snoop address (210) through. zSNPCYC is also used to enable the snoop latches (218 and 220) to capture the outputs from the tag RAM in the next SHCLK so that a hit or miss can be determined. In the RLS, zSNPCYC is used along with z(S,T,LS) MATCH to decide if the current line has been snooped out. zSNPCYC is also used to prevent the first snoop latch (218) from capturing the address bus a clock after EADS#, so that the snoop address can be maintained for a potential snoop invalidation. FIG. 18 shows the snoop cycle timing.

zTAI[0-16] are the tag address outputs of the TAG-MUX input mux (234). The polarity of zTAI is the opposite of xTAI. zLATSW selects which one of the two TAGMUX address latches (228 or 230) will generate zTAI during normal cycles. During snoop, zSELSNP will select the TAGMUX snoop latch (240) to generate zTAI.

zSELTSL1, zSELTSL2 select one of the two input address latches during a cycle. They are derived from zLATSW. During a snoop cycle, they get overridden by zSELSNP.

EADS# is latched by PCLK to generate zSNP. If zCSnn is present simultaneously, then zSNPCYC is created and the snoop is processed. FIG. 18 shows the relationship between all snoop-related signals. A chip-selected zSNP automatically stretches the current cycle by two clocks from the clock at which the EADS# occurred. If EADS# happened during an idle bus, then it would create a two-clock cycle.

zSNPHR is a tag hit signal from the right side of the tag RAM (216) that is captured at the first SHCLK after zSNPCYC as shown in FIG. 18. In conjunction with zSNPWAIT, it selects the way for snoop invalidation.

If a snoop look-up yields a hit, then zSNPWAIT is generated at the sampling SHCLK in FIG. 18 and lasts for one full clock. It enables the tag RAM for one more clock so that the corresponding line can be invalidated.

In ADSCON, zSNPWAIT is used in a redundant fashion to delay the start of a new cycle in response to an ADS#. It is redundant because if there is a snoop zINCYC will last long enough to cover the zSNPWAIT time period, and if zINCYC is active, then the next ADS# will be delayed anyway if it occurs when zINCYC is active. In TAGACC, it generates zWRLRU and zWRSTS commands that carry out the invalidation. In WAYCON, it creates zWAYSEL for proper way identification during the invalidation.

Read Hit Cycle

Figure 3:
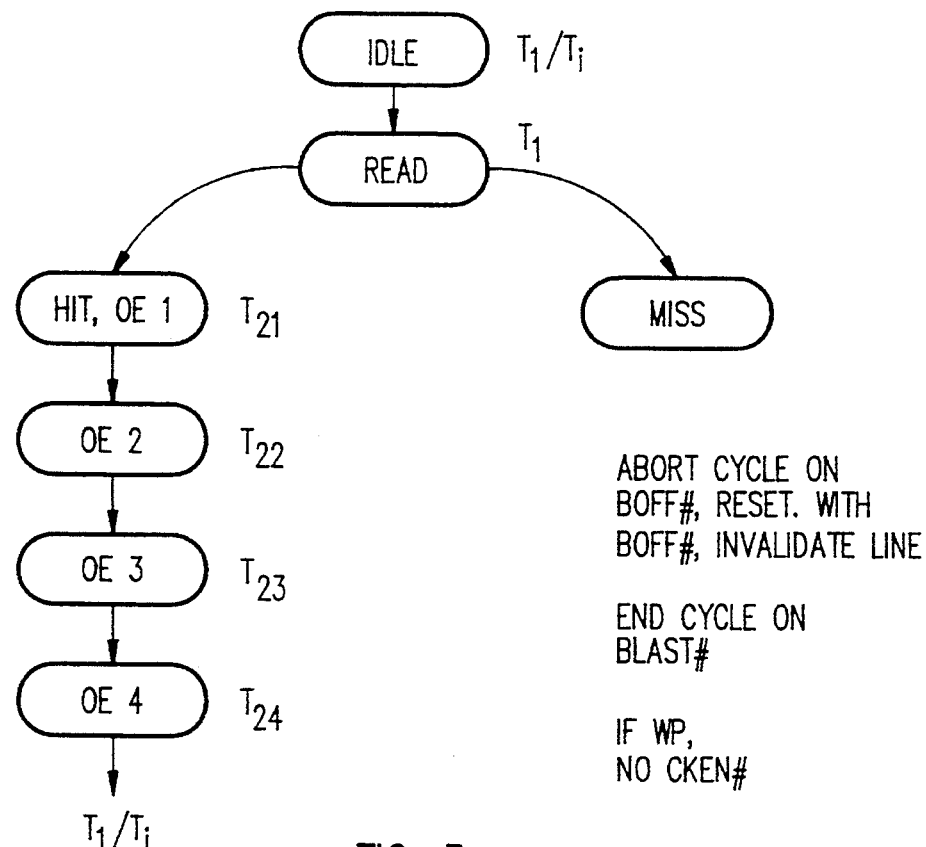
FIG. 3 is a flow diagram of a Read Hit Cycle.

Refer to FIG. 3 which is a flow chart of a Read Hit Cycle. A read hit cycle starts with zADSCYC and zRDSCYC. The tag look-up will yield a hit at the first SHCLK. BRDYO# will go active indicating a hit. Also the first output-enable (OE1) goes active. The first-enable is picked from the four possibilities using the burst address sequence as listed in TABLE II. Since the cache controller is signaling the transfers at every clock with BRDYO#, the logic will advance through TO22, TO23, and TO24 at every clock. The appropriate enable is created for each transfer. If a BOFF# interrupts the transfer, then a request is made to the tag RAM to invalidate the line. The LRU bit is not updated on a read hit.

Read Miss Cycle

Figure 4:
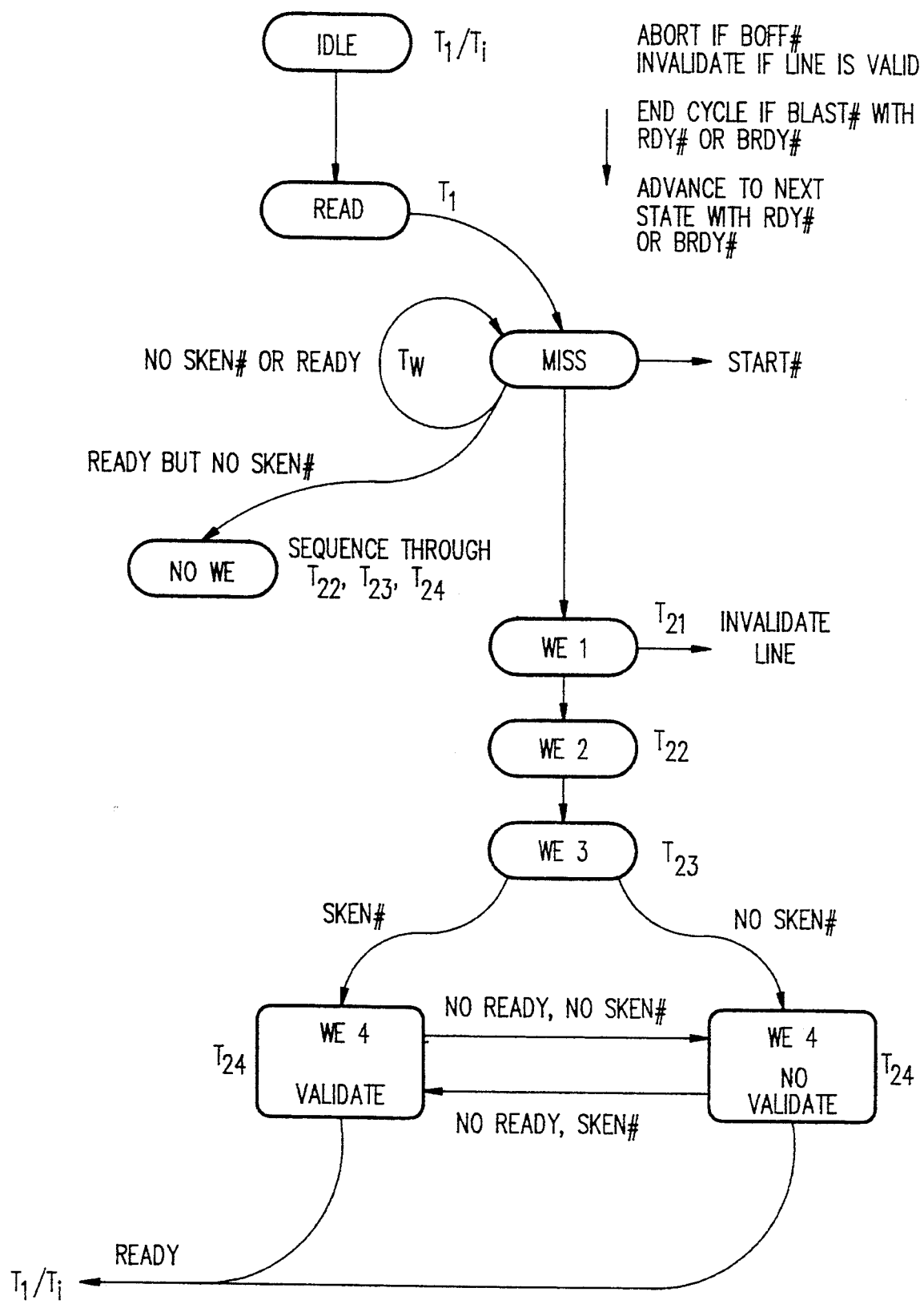
FIG. 4 is a flow diagram of a Read Miss Cycle.

Refer to FIG. 4 which is a flow chart of a Read Miss Cycle. A read miss cycle starts with zADSCYC and zRDSCYC. The tag look-up will yield a miss at the first SHCLK. START# goes active indicating a miss. From then on, the logic will wait until SKEN# is active. If SKEN# is active before the first transfer, then the line is said to be committed. A line in the tag RAM is selected (zWAYSEL) using the zADSLRU, zADSHL and zADSHR signals as shown in TABLE I.

TABLE I

| zADSHL | zADSHR | zADSLRU | zWAYSEL |
| --- | --- | --- | --- |
| hit | miss | X | left |
| miss | hit | X | right |
| hit | hit | X | right |
| miss | miss | 0 | left |
| miss | miss | 1 | right |

Tag write commands are issued to invalidate the line. Also the corresponding first write-enable is issued. The logic is in time period TO21. At each transfer from then on, the logic advances through TO22, TO23, and TO24. The cycle ends with a transfer in TO24 (see FIG. 6). The burst address sequence on the external bus is defined by the 486. Given that and which way the line fill is to be done (zWAYSEL), the logic can decide the order of the four write-enables. TABLE II lists the sequences. There are two memories, top and bottom, and each memory has two banks, A and B. Hence, for example, TA would stand for an enable to top memory, bank A.

TABLE II

| BURST SEQUENCE | WAY | ENABLE SEQUENCE |
| --- | --- | --- |
| 0,4,8,C | left | TA, TB, BA, BB |
| 0,4,8,C | right | BA, BB, TA, TB |
| 4,0,C,8 | left | TB, TA, BB, BA |
| 4,0,C,8 | right | BB, BA, TB, TA |
| 8,C,0,4 | left | BA, BB, TA, TB |
| 8,C,0,4 | right | TA, TB, BA, BB |
| C,8,4,0 | left | BB, BA, TB, TA |
| C,8,4,0 | right | TB, TA, BB, BA |

The third transfer ends TO23 and begins TO24. While the logic is in TO24, SKEN# is monitored until the cycle ends. An active SKEN# will result in a request to the tag RAM to validate the line, if the line is not already valid. An inactive SKEN# will result in a request to invalidate the line if the line is not already invalid (see FIG. 8). The write-protect pin (WP) is written at each such request. The LRU bit is made to point to the other way, if the line will be left in a valid state. If the line is valid, and the cycle is aborted with a BOFF#, then a request will be made to tag RAM to invalidate the line.

Direct-Processor Write Cycle

Figure 5:
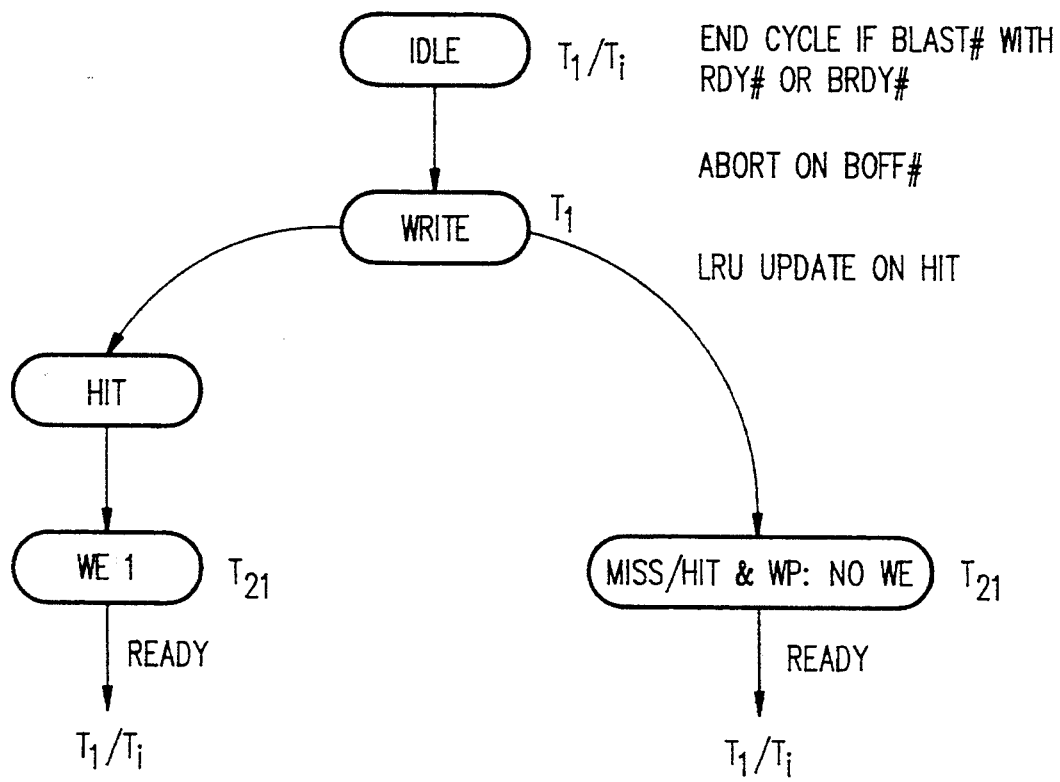
FIG. 5 is a flow diagram of a Write Cycle.

Refer to FIG. 5 which is a timing diagram of a Write Cycle. A direct-processor write cycle starts with zAD- SCYC and zWRSCYC. START# goes out at the first SHCLK. If it is a hit at the first SHCLK, then the appropriate enable is sent out (see TABLE II). The LRU bit is made to point to the other way on a hit. On a miss, nothing is done and only START# can be seen active.

Flushing Tag RAM

The tag RAM is flushed whenever zRESET or zFLUSHnn is active. It takes one clock to flush the tag RAM. All pending write-requests to the tag RAM are withdrawn at zFLUSHnn and zRESET. A zFLUSHnn during a line-fill after or at the first transfer has the same effect as a self-snoop.

Write-Protect Management

Since there is only one write-protect bit per way, each bit protecting two lines. A special situation arises when one line is valid and write-protected and the other one is being filled but will not be write-protected. In this circumstance, the line being filled will win and set the write-protect bit to a zero. The other line is invalidated to avoid having a valid write-protected line with the write-protect bit set to zero.

Example:

|  | V0 | V1 | WP |
|---|---|---|---|
| In the beginning: | 0 | 1 | 1 |
| Line fill to line 0 with write protect pin 0 | | | |
| At the end: | 1 | 0 | 0 |

Operation of the Various Cycles

Figure 6:
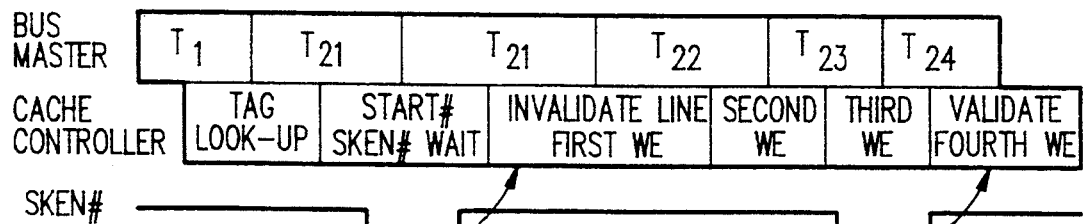
FIG. 6 is a timing diagram of how the bus master activates for a normal line fill.

Refer to FIG. 6 which is a timing diagram of how the bus master activates for a normal line fill. In FIG. 6 the top row of boxes represent XCLK boundaries. The bottom row of boxes represent the corresponding activities performed by the cache controller at SACLK boundaries. SKEN# is shown and the corresponding reaction is depicted in the bottom row of boxes.

Figure 7:
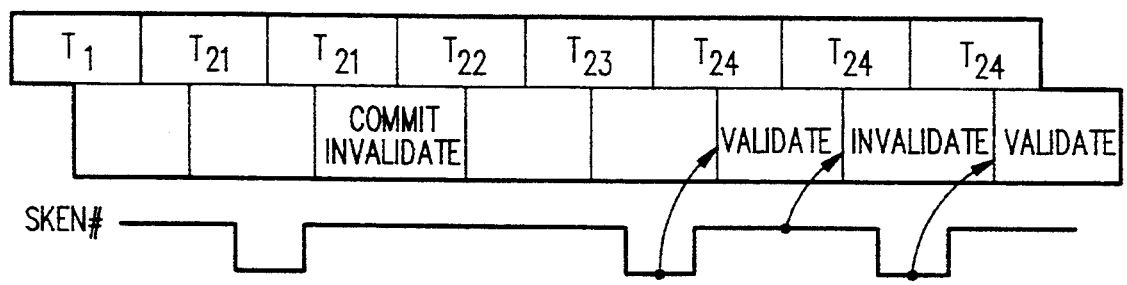
FIG. 7 is a timing diagram of a ping-ponging SKEN# in a line fill.

Refer to FIG. 7 which is a timing diagram of a ping-ponging SKEN# in a line fill. The cache controller follows SKEN# in TO24 and reacts correspondingly. FIG. 7 shows an alternating SKEN# and illustrates that the cache controller alternately validates and invalidates the line.

Figure 8:
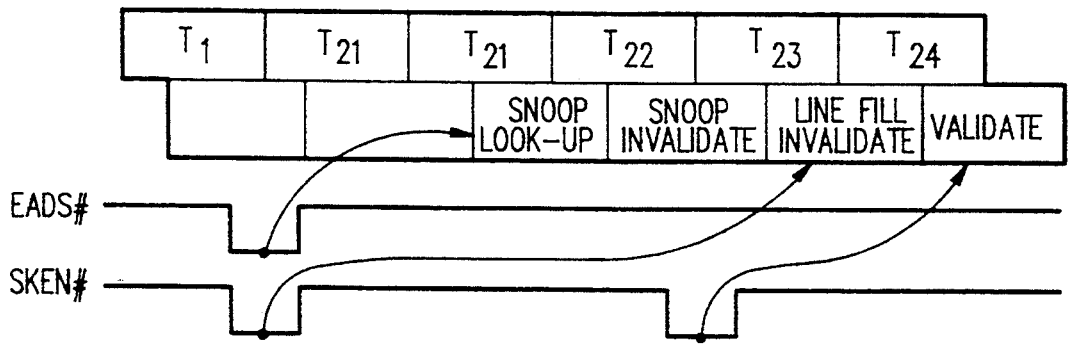
FIG. 8 is a timing diagram of a snoop cycle with the first SKEN#.

Refer to FIG. 8 which is a timing diagram of a snoop cycle with the first SKEN#. As shown in FIG. 8, the EADS# signal takes precedence over normal access to the tag RAM. FIG. 8 illustrates how the invalidation request generated by the first SKEN# is delayed so that the snoop can be processed. The snoop is shown to be hit. If the snoop is a miss, then the snoop invalidation will not take place and a pending access to the tag RAM will be processed instead.

Figure 9:
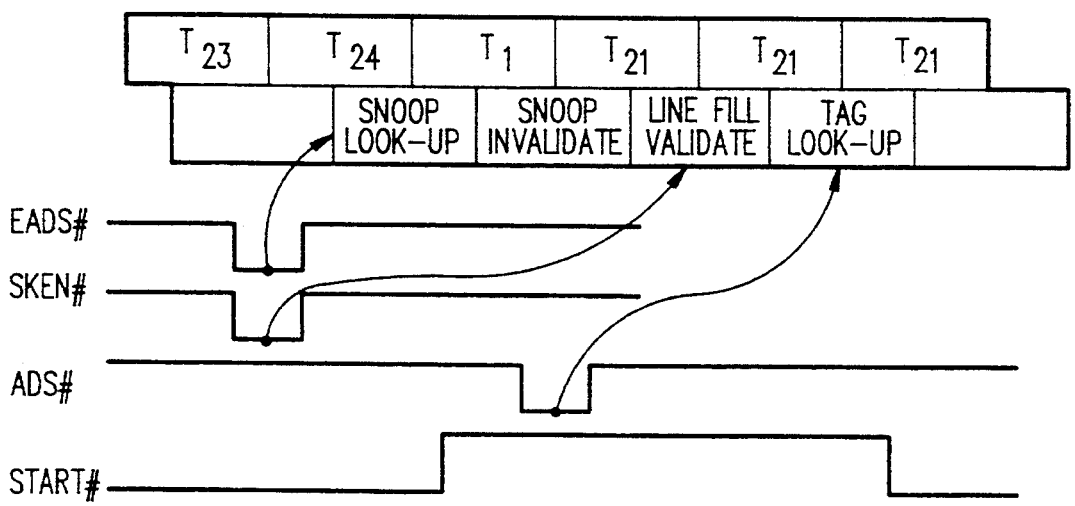
FIG. 9 is a timing diagram of a snoop cycle with the second SKEN#.

Refer to FIG. 9 which is a timing diagram of a snoop cycle with the second SKEN# to shows how a snoop extends a cycle. As shown in FIG. 9, the ADS# is made to wait until the tag RAM is available for an access.

Figure 10:
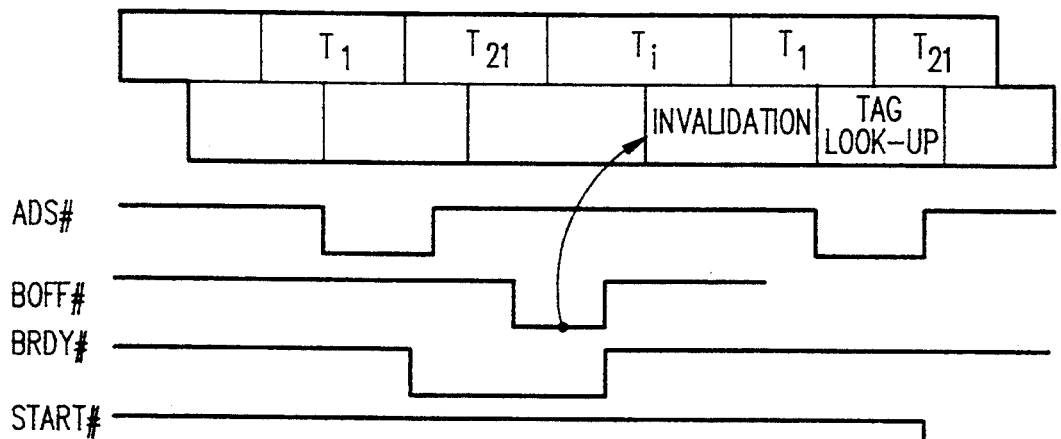
FIG. 10 is a timing diagram illustrating BOFF# and line invalidation in a read hit cycle.

Refer to FIG. 10 which is a timing diagram illustrating BOFF# and line invalidation in a read hit cycle. As shown in FIG. 10, a BOFF# signal occurring during a read-hit will invalidate the line. Since there is a one clock bus-recovery period after BOFF#, the invalidation can be done during that time without affecting the subsequent cycles.

Figure 11:
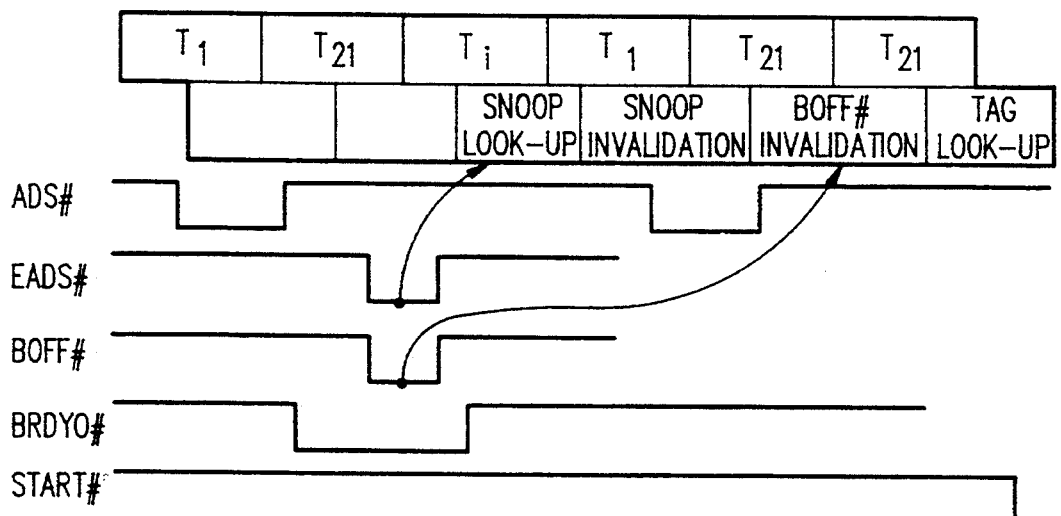
FIG. 11 is a timing diagram illustrating how a snoop delays a BOFF# invalidation and the subsequent cycle.

Refer to FIG. 11 which is a timing diagram illustrating how a snoop delays a BOFF# invalidation and the subsequent cycle.

Figure 12:
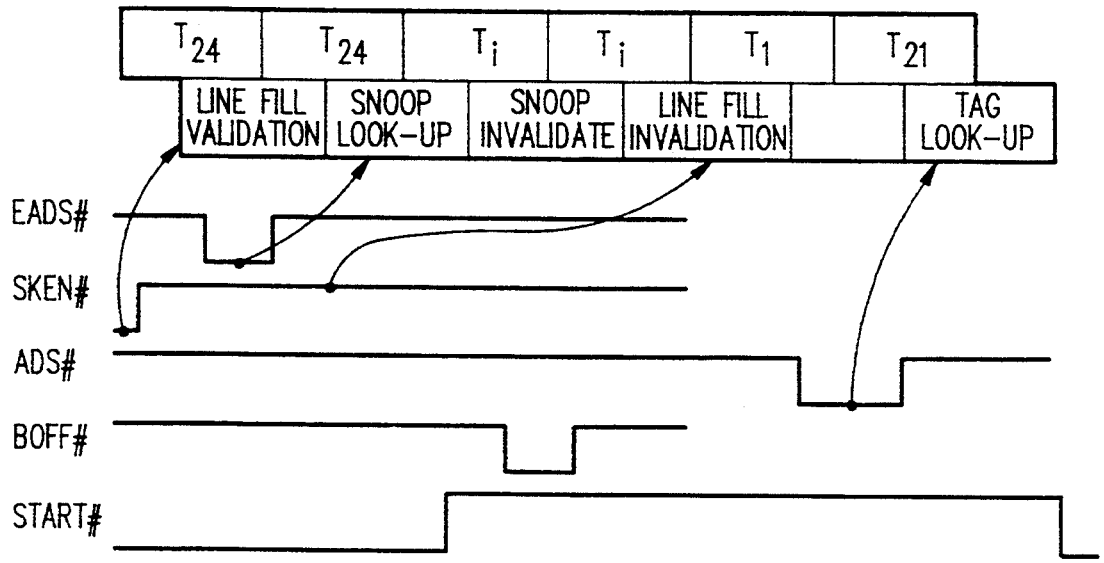
FIG. 12 is a timing diagram illustrating BOFF# after the last transfer in a line fill with snoop.

Refer to FIG. 12 which is a timing diagram illustrating BOFF# after the last transfer in a line fill with snoop. In FIG. 12, BOFF# is applied after all the four transfers have taken place. A snoop delays the validation request resulting from an inactive SKEN# a clock before last transfer. BOFF# in this region has no effect on the cycle.

Signal Descriptions

Each internal signal name begins with a characteristic letter that identifies its generic source. The first character can be one of {r, t, x, y, z} as set forth in TABLE III.

TABLE III

| First character | Source |
|---|---|
| r | RLS |
| t | tag RAM |
| x | External signal |
| y | External signal delayed by buffer |
| z | Originates at a latch in BISC |

The remaining part of the signal name is in upper case letters. A signal ending in "nn" means it is a low-true signal. The corresponding notation for an external signal will have "#" instead. Also, brackets '{ }' are used to describe signal names containing the substrings within the brackets. For example, rWR{STS, TAG, LRU} stands for rWRSTS, rWRTAG, and rWRLRU, respectively. When the substrings are one character in length, then a pair of brackets are used without separating the characters with a comma. For example, [yz]ADSnn means yADSnn and zADSnn. Brackets are also used to denote ranges. For example, zSAI{0-10} stands for zSAI0, zSAI1, . . . , zSAI10. When such multiple-bit signals are referred to, the range-specifier is deleted. For instance, the eleven zSAI[0-10] signals are denoted as zSAI. If a signal is internal to a logic block, then it will be in all lowercase letters and in italics. Example: terminate. None of the x External signals are described below. Only some of the y External signals delayed by buffer are discussed, since all of them are buffered versions of the corresponding x external signals.

rBAO1B, rBAO1T
Source: RLS
Destination: SECSEL

The RLS generates xBAO1B and xBAO1T, respectively. As the cycle starts, the r signals will be such that the x signals follow xBAI1 input until the first transfer. After the first transfer, the r and x signals will change in such a way that, if the first transfer came out of the top bank of memories, then the third-and-fourth transfers will come out of the bottom bank of memories and vice versa. In other words, if the first transfer is from the top bank, then [rx]BAO1B will change and if the first transfer is from the bottom bank, then [rx]BAO1T will switch.

rBCLRnn, rTCLRmm
Source: RLS
Destination: OE

Figure 13:
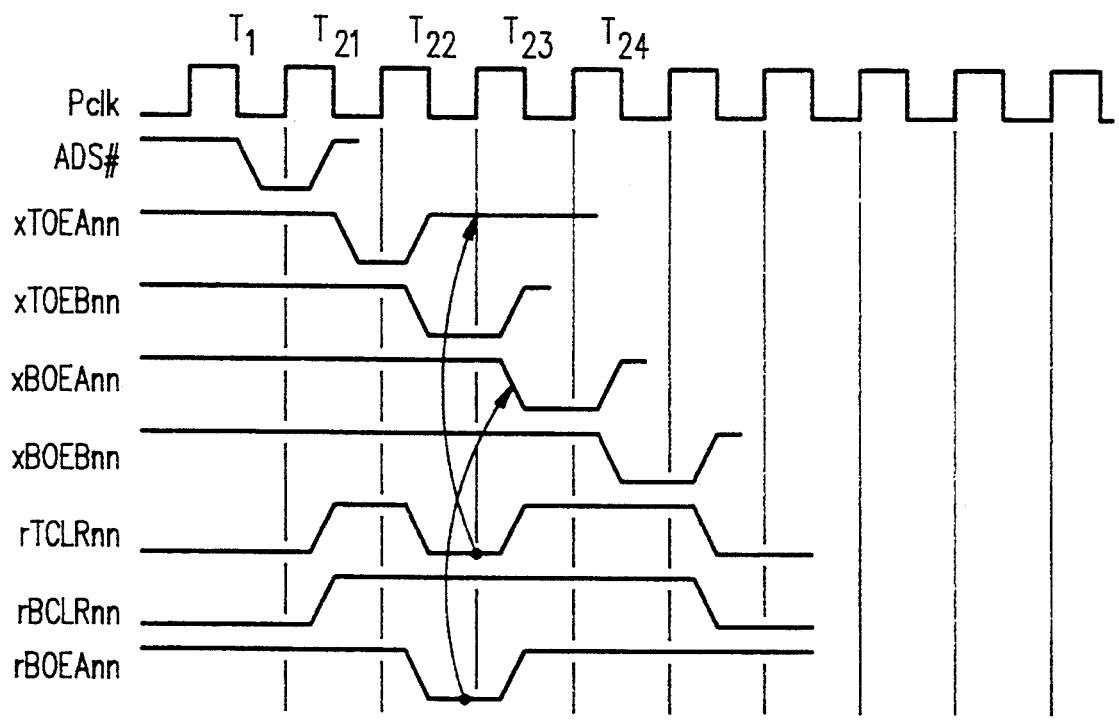
FIG. 13 is a timing diagram of the generation of output enable.

The Output Enable circuit produces four enables in a complete hit cycle. The enable signals for top bank are produced by a toggle circuit that will trigger the two enables alternatively until cleared by rTCLRnn. The bottom two enables are generated in a similar manner and rBCLRnn is the corresponding clear signal. FIG. 13 shows one instance of output enable generation. Here it is assumed that the enables are generated in the order shown. The first enable, xTOEAnn will automatically trigger the second, xTOEBnn. If the oscillating circuitry is not turned off, xTOEBnn will trigger xTOEAnn, ad infinitum. rTCLRnn acts as the turn-off signal. During a cycle, the appropriate clear signals are active only during TO22. Once a particular set of enables are turned off, the next set has to be triggered. The corresponding trigger signals are r[TB]OE[AB]nn which are described subsequently.

rBOEAnn, rBOEBnn, rTOEAnn, rTOEBnn
Source: RLS
Destination: OE

These are trigger signals used to trigger a particular output enable. The first enable is automatically generated by the hit pulse. The second one is also automatically generated. The third enable is activated by one of the trigger signals. Four such triggers are required because, depending on which output enable came first, the third one could be any one of the four. See FIG. 14. If there is a snoop along with the ADS# that starts a read cycle, then the read cycle is forced to be a line-fill because a snoop with ADS# means self-invalidation. In this case zLNFIL will be active and the RLS will abort the generation of the trigger signals. zLNFIL will also be active, if zFLUSHnn was found active along with ADS#.

rTWEAnn, rTWEBnn, rBWEAnn, rBWEBnn
Source: RLS
Destination: WE

These are write enable triggers, similar to r[TB]OE[AB]nn in operation. The trigger signals are required only on read miss cycles. In such cycles, the RLS selects the appropriate write enable by asserting one of the trigger signals. FIG. 14 shows an example where the enables are generated in the shown order. The first enable (xTWEAnn) is generated as soon as the first SKEN# is seen. The WE circuitry reacts to the first SKEN# immediately. The remaining three enables are controlled by the RLS trigger signals.

The logic for each trigger signal depends on the burst address and the write enable currently active. To give an example, the logic for rBWEAnn is as follows. Bottom memory, bank A contains either burst address eight (xBAI is 'b10), way left, or burst address zero (xBAI is 'b00), way right.

1. If xBAI is 'b00, and The logic is currently writing to top memory, bank B, then we must have a 048C burst order sequence with left way selected.
2. If xBAI is 'b01 and The logic is currently writing to bottom memory, bank B, then we must have a 408C sequence with right way selected.
3. If xBAI is 'b10 and The logic is currently writing to top memory, bank B, then we must have a 8C04 sequence with right way selected.
4. If xBAI is 'b11 and The logic is currently writing to bottom memory, bank B, then we must have a C840 sequence with left way selected.

In all four cases, the next write is to bottom memory, bank A. The RLS will generate rBWEAnn, which will trigger xBWEAnn in the WE circuitry. The triggers do not take part in generating the write enables during direct-processor write cycles.

rCKENnn
Source: RLS
Destination: CKN rCKENnn specifies the behavior of xCKENnn. It comes out of a combinational block. rCKENnn is latched at the CKN FUB and then combined with zINADSnn to produce xCKENnn. rCKENnn goes inactive as zADSCYC is seen going active. In the next clock, depending on the hit and write-protect signals, it will either remain inactive or go active. The state of the signal is then maintained until the end of the cycle, which is signified by the terminate signal.

rCLRVL, rCLRVR
Source: RLS
Destination: TAGIFC

The TAGIFC logic captures the output of tag RAM at the first SHCLK after the first ADS# that begins a cycle. The captured outputs are kept in the ADS latches until the cycle ends. On a line fill, the valid information for the current line is generated as a function of SKEN#. The valid information for the other line within the set is obtained from the ADS latches. Then the information for both the lines is written into the tag RAM. The rCLRV[LR] signals are used to clear this "other" line information, when that line has been invalidated during the cycle, either through an explicit snoop or using flush.

rEXCYC
Source: RLS
Destination: ADSCON, BRDYO, OE, SECSEL, SETMUX, START, TAGMUX, WE, PCESA, SELCON rEXCYC keeps track of when the external system starts and ends its cycle. It starts when the logic recognizes ADS# (signified by zADSCYC) and ends when terminate becomes true.

rLATSEL
Source: RLS
Destination: BMUX, SETMUX, TAGMUX

As shown in FIG. 15, there is a set of two latches to capture the cycle address. At any time, except when the next cycle has started, but the current cycle is still in progress, one latch is open to the external world, in the sense that at every SACLK, the input address is latched by that latch. The other latch holds the current cycle address until the cycle ends. rLATSEL selects the latch that will remain exposed to the external world. The reason for having two address latches is as follows. The current cycle can be extended with snoops. The current cycle address has to be maintained as long as the cycle is still in progress. In the meanwhile, the external cycle (monitored by rEXCYC), might have ended and a new one started. The second address latch that is exposed to the world is used to capture the address corresponding to this new cycle.

rLATSEL switches when the current cycle ends (when zINCYC becomes inactive). As shown in FIG. 15, rLATSEL controls which of the two input latches will receive xSAI at the next SACLK. zLATSW indirectly selects which of the two latches will supply the address to the tag RAM. The snoop controls are described under zSELSNP.

FIG. 16 shows the timing of various signals that control the input mux. In FIG. 16, rLATSEL toggles as cycle starts, opening up the other latch to the external world. zLATSW continues to supply the tag RAM from the current latch. zLATSW will switch to the other latch as the cycle ends (zINCYC going inactive). zSBEN and zTEN are control signals which decide if the latch selected by rLATSEL will receive the external address at the next SACLK. If the current cycle is still in progress, and the next cycle begins, then zSBEN and zTEN turn off the latch to which rLATSEL points until the logic reacts to the ADS#.

rLRUFLP
Source: RLS
Destination: TAGIFC

The LRU bit has to be flipped to the other way when the current line is to be validated. This is automatically done in the TAGIFC logic block. However, if the line is to invalidate due to, for example, ping-ponging SKEN#, then the LRU bit has to be flipped back to point to the old way. rLRUFLP provides the data for flipping the LRU bit. If it is zero, then LRU is made to point to the other way during a tag update. If it is a one, then the LRU is set to original value during the tag update.

rRDYEN
Source: RLS
Destination: MUXCON, OE, START, WE, SELCON rRDYEN qualifies the sampling of RDY# and BRDY# signals. When the external memory returns BRDY# during a line fill, the four transfers take place within four clocks. rRDYEN stays active throughout, enabling the logic to sample and react to BRDY#. On the other hand, when the line fill is being run with RDY#, then the logic has to, after every RDY#, wait for a new ADS# before sampling RDY#. rRDYEN turns off if RDY# is returned and stays inactive until another ADS# is seen active. It terminates when the cycle terminates with the terminate signal.

rT21
Source: RLS
Destination: MUXCON, WAYCON

The period from when ADS# is recognized until the first transfer takes place is called TO21. rT21, when active, signifies that the logic is in TO21. MUXCON uses it to determine if SKEN# should be sampled so that the current line-fill cycle can be committed. WAYCON uses it to determine if the way selection mechanism should select the current write-enable, or should RLS do so using one of r[TB]WE[AB]nn signals.

rV
Source: RLS
Destination: TAGIFC rV is the valid bit information which gets written to the tag RAM at appropriate times. The valid information for the current line is a one if The logic is in TO24 of a committed line fill, and SKEN# is active provided BOFF# is inactive. Otherwise, it is a zero. If a tag write command (rWRSTS) has been issued and pending, then rV will maintain its previous value.

rWECONnn
Source: RLS
Destination: WE

This functions similar to the way zWAYEN does in preventing the address mechanism in the WE circuitry from generating the current write-enable.

rWRLRU, rWRSTS, rWRTAG
Source: RLS
Destination: TAGACC

These are the tag-write commands which decide when to update the tag RAM. The status-write commands are active at the following times:
1. The logic is in TO21 in a committed line-fill cycle.
2. The logic is in TO24 in a committed line-fill cycle and the line status has to be changed.
3. The external cycle has ended, but the logic still has not seen the acknowledgment for an earlier write request.
4. The external cycle has not yet ended, and the logic is still waiting for an acknowledgment for an earlier write request.
5. BOFF# happens before a read cycle is completed and the line is valid.
6. The cycle is a self-test write.
7. The logic is in a read-hit cycle and the BOFF# happens.

The LRU bit has to be written at the following situations:
1. The logic is in TO24 of a committed line-fill cycle and the line status has to be changed.
2. The external cycle has ended, but the logic has not seen the acknowledgment for an earlier write request.
3. The external cycle has not yet ended, and the logic is still waiting for an acknowledgment for an earlier write request.
4. The line is valid, but a BOFF# has happened.

The tag bits are written whenever the status bits are written. The acknowledgment for a write command comes from TAGACC which, when the tag RAM is ready to honor the write command from RLS, generates zSTSACK. The write-commands persist as long as the acknowledgment is not seen.

tHL, tHR, tLRU, tVL0, tVL1, tVR0, rVR1, tLWP, tRWP
Source: TAGRAM
Destination: BRDYO, MUXCON, OE, START, TAGIFC, WE These are the outputs from tag RAM that indicate if the current access was a hit or a miss. For a hit, both the tag bits (tHL or tHR) and the corresponding valid bits (tVL[01] or tVR[01]) have to hit simultaneously. tLWP and tRWP are the write-protect bits from the left and right sides, respectively. The OE, WE, BRDYO and START circuits directly use these signals to decide if it is a hit cycle or a miss cycle. MUXCON uses them during snoop cycles to decide if the snoop was a hit. For a normal cycle, TAGIFC captures these signals in the ADS latches to produce zADS(HL, HR, VL0, VL1, VR0, VR1) and zRLS[LR]WP signals. During a snoop, these signals are captured in the snoop latches. The outputs from the snoop latches remain local to TAGIFC.

terminate
Source: RLS
Destination: RLS

The terminate signal is internal to RLS. It signifies the end of a cycle. It is triggered by a valid BLAST# (xBLASTnn along with any of the ready's: xRDYnn, xBRDYnn, xBRDYOnn), RESET or BOFF#.

yADSnn
Source: ESAIFC
Destination: ADSCON, BRDYO, OE, START, WE, PCESA, SELCON

This is a buffered version of xADS#.

yADSF
Source: ESAIFC
Destination: TAGACC

This is an inverting version of yADSnn. It is used in TAGACC to create zADDECnn.

yBOFFnn
Source: PCIFC
Destination: BRDYO, MUXCON, OE, START, WE, PCESA, SELCON

This is a buffered version of BOFF#. In BRDYO and START, yBOFFnn is used in the generation side of zSTARTnn and zBRDYOnn. In OE and WE, yBOffnn suppresses the generated enables from going out of the chip.

zADDECnn
Source: TAGACC
Destination: TAGRAM

The tag RAM will do a look-up only when zADDECnn signal is active. When a cycle is in progress, zADDECnn is active. During idle bus cycles, it will remain inactive. The tag RAM will do a look-up whenever yADSF, zADSWAIT, or zINCYC is active, provided there is no zBOFFnn.

zADSCS
Source: SELCON
Destination: RLS, TAGIFC

When active, zADSCS means that current cycle has been chip-selected. In RLS it controls most of the r signals. In TAGIFC, it controls the enable signal to the ADS latches which capture the tag RAM outputs at the beginning of a cycle. All other circuits sample yCSnn or zCSnn directly.

zADSCYC
Source: ADSCON
Destination: MUXCON, RLS, TAGIFC

Figure 17:
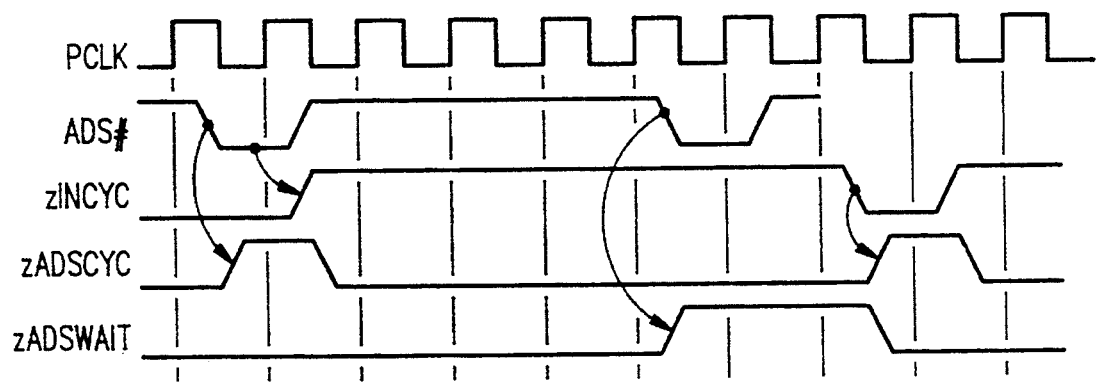
FIG. 17 is a timing diagram of the generation of the zADSCYC signal.

This signifies the start of a bus cycle. zADSCYC is triggered by ADS# when there is no cycle in progress. If a cycle is in progress when the ADS# for the next cycle arrives, then zADSWAIT is activated which will activate zADSCYC when the current cycle ends. zADSCYC does not respond to I/O cycles. It lasts for one full SACLK. FIG. 17 shows the relationship between zINCYC, zADSCYC, and zADSWAIT.

zADSLRU
Source: TAGIFC
Destination: RLS, WAYCON zADSLRU is tLRU captured at the first SHCLK after zADSCYC. The value is held until the cycle ends. The latch is clocked by SHCLK end enabled by zADSCYC and zADSCS. In RLS, zADSLRU clocked by PCLK and then is used to create rLRUFLP. In WAYCON, it is used to generate zWESEL, zWAYSEL and zIWAYSEL.

zADSV[LR][01], zADSH[LR]
Source: TAGIFC
Destination: RLS, WAYCON, TAGACC

These are tV[LR][01] and tH[lr], respectively, captured at the first SHCLK after zADSCYC. The latches are enabled by zADSCS and zADSCYC. RLS uses them to create local hit/miss information. WAYCON uses zADSHR to create zWESEL, zWAYSEL, and zIWAYSEL. In TAGACC, these signals generate zWRLRU during a direct-processor write-hit cycle.

zADSnn
Source: PCESA
Destination: RLS

This is yADSnn captured using a transparent SACLK latch. In RLS, it is caught by a PCLK flip-flop and used internally to create rRDYEN.

zBAI[01]
Source: BMUX
Destination: OE, RLS, SAOTB, WE zBAI[01] are xBAI[01], respectively, captured with a transparent SACLK latch. In OE and WE, they select which of the four output or write enables will be the first to go if the cycle turns out to be hit or a miss. Together they determine if the burst order on the external bus is 0, 4, 8, or C. Combined with the fact that the first d-word for any particular burst order resides in a corresponding bank on the external SRAM, the first output or write enable can be generated using zBAI[01] along with the way to which the hit or miss will refer. RLS uses them in a similar way to create the trigger signals for OE and WE. In SAOTB, the zBAI1 is combined with rBAO1[TB] to create xBAO1[TB].

zBLASTnn
Source: PCESA
Destination: RLS

This is a latched version of yBLASTnn. All BISC logic that need BLAST#, use yBLASTnn directly.

zBOEAD, zBOEBD, zTOEAD, ZTOEBD
Source: OE
Destination: RLS

Functionally, these are latched versions of x[TB]O-E[AB]nn, respectively. Within the OE circuit, they are inversions of z[TB]OE[AB]nn which are sent out as z[TB]OE[AB]nn. The z signals are used in RLS to determine which output enable has gone out and what the next one should be.

zBOEAnn, zBOEBnn, zTOEAnn, zTOEBnn
Source: OE
Destination: PAD

These are internal versions of x[TB]OE[AB]nn. As they come out of the OE circuitry, they are qualified by the chip-select signal (yCSnn) and BOFF# terms. In essence, the internal logic will generate all the enables even if the chip is not chip-selected. However, if there is no chip-select, the z signals will be blocked at the output of OE. On BOFF#, the current enable will be blocked by the OE circuitry at its output. The corresponding z signal will remain active for at least one clock. The first enable comes directly off the tag RAM hit signals and the remaining enables are controlled by RLS.

zBOFFnn
Source: PCESA
Destination: ADSCON, RLS, TAGACC

This is a latched version of yBOFFnn. In ADSCON, it kills any pending ADS# (ZADSWAIT). In RLS it generates terminate. TAGACC uses it to abort zADDECnn, and zWRLRU.

zBRDYOnn, zIBRDYnn
Source: BRDYO
Destination: MUXCON, RLS, PAD, SELCON

These are internal versions of xBRDYOnn. For interconnect loading reasons, the internal signal was split into two, one meant for SELCON (zIBRDYnn) and the other for the remaining three. zBRDYOnn is triggered directly off the tag RAM outputs on a read-hit cycle. The chip-select signal gates zBRDYOnn and zIBRDYnn from going out of the BRDYO block.

zCOMMIT
Source: MUXCON
Destination: RLS

During a line fill, an active SKEN# before the first transfer commits the line fill. Once committed, a line is chosen in the tag RAM and invalidated. When the line fill completes, depending on the second SKEN#, the line is either validated or left invalidated. zCOMMIT is the signal that informs RLS that the line has been committed, so that RLS can generate the control signals for the remaining three write-enables. zCOMMIT is also active during direct-processor write cycles.

zCSnn
Source: SELCON

Destination: ADSCON, MUXCON, RLS, TAGACC

This is a latched version of yCSnn. Both normal cycles and snoop cycles have to be enabled by zCSnn or yCSnn for regular processing to continue.

zFLUSHnn
Source: PCIFC
Destination: BRDYO, OE, RLS, RLSCON, START, TAGACC, PCESA zFLUSHnn comes off a two-clock synchronizer in PCIFC. If a read-hit cycle is about to begin and zFLUSHnn is active, then BRDYO and OE abort the generation of zBRDYOnn and the first enable. At the same time, START generates zSTARTnn to signify a forced line-fill cycle. RLS uses it to decide if current cycle has been invalidated either through snoop or through flush. In TAGACC, the tag write commands are qualified with zFLUSHnn so that the commands can be withdrawn when the tag RAM is being flushed. In PCESA, zFLUSHnn creates zTFLSHnn.

zINCYC
Source: MUXCON
Destination: ADSCON, RLS, TAGACC zINCYC is active when a cycle is being processed by the cache controller. It starts as soon as a cycle begins either with zADSCYC or zADSWAIT and continues on until a termination condition is reached (terminate). At termination, if there are requests to tag RAM pending, then zINCYC remains active until all requests have been satisfied. There are two sources for tag RAM requests: RLS (rWR(STS,TAG,LRU)), and snoops (zSNPCYC, zSNPWAIT). zINCYC will remain active as long as the RLS write commands are, provided there is no zSTSACK from TAGACC. See FIG. 16 for an example of how zINCYC behaves. Snoops automatically extend zINCYC by two clocks from the clock at which EADS# occurs. This means that if EADS# occurred during idle bus, zINCYC will be active for two clocks. In ADSCON, zINCYC is used to decide if zADSCYC or zADSWAIT should be generated in response to a new ADS#. In TAGACC, it generates zADDECnn. In RLS, it is used to control all signals that activated during a cycle.

zINADSnn
Source: MUXCON
Destination: CKN, WAYCON

This is exactly the same as zINCYC except that snoop does not extend zINADSnn, as it does zINCYC. In CKN, it is combined with rCKENnn to generate xCKENnn.

When zINADSnn is inactive, xCKENnn is forced active. In WAYCON, it is used to create zWAYEN.

zLATSW
Source: MUXCON
Destination: BMUX, SETMUX, TAGMUX zLATSW is used in conjunction with rLATSEL to switch the two input address latches so that the tag RAM sees a constant address for the duration of a cycle and at the same time a new cycle address can be received. See FIG. 15 and FIG. 16. zLATSW does not directly control the mux. It creates two signals, zSELTSL1 and zSELTSL2, which do.

zLNFIL
Source: RLSCON
Destination: RLS

If EADS# or zFLUSHnn occurs along with ADS#, then it is too late to abort the tag access initiated by ADS# due to differences in set-up times. This combination of inputs means a miss. If the access turns out to be a hit, then the hit information has to be discarded. yEADSnn and zFLUSHnn are directly sampled by OE, BRDYO and START to abort the reaction to read-hit. In RLS, zLNFIL is used to abort all r[TB]O-E[AB]nn. It is also used to determine if The logic is in a self-invalidation cycle.

zLS
Source: BMUX
Destination: BRDYO, MUXCON, OE, RLS, START, TAGACC, TAGIFC, WE

This is the latched version of yLS. The two-latch muxing scheme (FIG. 15) is used to capture yLS. zLS selects the sector to operate on during snoops and normal cycles. All circuits make sure that when snoop during a cycle asserts zLS, its state is properly restored after snoop processing is done.

zLSMATCH, zSMATCH, zTMATCH
Source: BMUX, SETMUX, TAGMUX, respectively
Destination: RLS During a line fill, the RLS must know if the current line has been snooped out before generating validation requests to the tag RAM. The match signals are asserted when the corresponding address bits between the snoop and cycle addresses match. The comparison is done between the contents of the cycle address latch selected by zLATSW and that of the first snoop latch (FIG. 15).

zPTRDAT
Source: TAGIFC
Destination: TAGRAM

This is the LRU bit to be written into the tag RAM. On all tag RAM updates during normal cycles zPTRDAT is the inverse of zADSLRU. If, however, rLRUFLP is active, then zPTRDAT takes the same value as zADSLRU. During snoop hits, zPTRDAT is set to the way opposite to where the snoop invalidation is done.

zPTROVR
Source: WAYCON
Destination: TAGIFC zPTROVR allows overriding of the LRU pointer during snoops. When active, it forces the LRU to point to the way opposite to where the snoop invalidation is taking place. In simple terms, it is zSNPWAIT captured by a SACLK latch.

zRDSCYC
Source: ADSCON
Destination: BRDYO, OE, RLS, RLSCON, SLFTST, START

This is the same as zADSCYC except that it further distinguishes the cycles as a read cycle.

zRDYnn, zBRDYnn
Source: PCESA
Destination: RLS

These are latched versions of yRDYnn and yBRDYnn.

zRESET, zRESETnn
Source: PCIFC, RLS, respectively
DESTINATION: ADSCON, BRDYO, MUXCON, OE, RLS, SLFTST, START, WE, PCESA; SELCON ZRESET is RESET after synchronization. It takes two clocks to recognize RESET, which means that there will be two clocks before zRESET is created after RESET. At power-up, RESET should be active for at least 100 clocks to stabilize the internal clock generator. At other times, RESET can be as short as one clock. After RESET has gone away, a minimum of four clock idle bus is required before a cycle can start. zRESETnn is zRESET buffered up by RLS for a cross-chip route to SELCON. The tag RAM is flushed at every clock in which zRESET is active.

zRLSLWP, zRLSRWP
Source: TAGIFC
Destination: RLS

The tag RAM has one write-protect bit for each way. The tag RAM outputs, tLWP and tRWP, represent the contents of those bits, In TAGIFC, the tag RAM outputs are captured at the first SHCLK after cycle starts, and kept until the cycle ends. Due to historical reasons, the write-protect outputs of the SHCLK latches are further captured at the next SACLK before being sent to RLS. The status of write-protect bits are meant for RLS where they are used to decide if CKEN# should be kept inactive during a read-hit cycle.

zSAI[0-10]
Source: SETMUX
Destination: TAGRAM

These are the set address outputs of the input mux (FIG. 15). The polarity of zSAI is opposite of xSAI. zLATSW selects which one of the two address latches will generate zSAI during normal cycles. During snoop, zSELSNP will select the snoop latch to generate zSAI.

zSAO[0-10]
Source: SETMUX
Destination: SADRVR

These provide load isolation for the set address inputs. zSAO are meant for the module SRAMs only. By latching and buffering xSAI internally, we avoid having the bus master drive the load offered by the SRAMs. The zSAO latch is enabled by rEXCYC so that when the address outputs remain constant as long as the bus master is running a cycle. zSBEN serves as an additional enable signal so that if a new cycle starts while the current cycle is still in progress, the SAO latch does not lose the new cycle address due to AHOLD. See FIG. 15.

zSBEN, zTEN
Source: SELCON, PCESA, respectively
Destination: SETMUX, BMUX, TAGMUX These are qualifiers that enable the input address latch selected by rLATSEL to receive the external address. They are usually active all the time. The only situation when the turn-off is when the current cycle is extended by pending tag accesses and the next cycle starts. zSBEN and zTEN remain inactive preventing the input latch from losing the latched new-cycle address until the logic can begin processing the new cycle.

zSELSNP
Source: AMUXCON
Destination: BMUX, SETMUX, TAGMUX zSELSNP selects the snoop latch during snoop look-up and snoop hit. If an EADS# was at a PCLK and it was chip-selected, then zSELSNP is active for at least one clock from the next SACLK. If the snoop is a hit, then zSELSNP lasts for another full SACLK (FIG. 18).

zSELTSL1, zSELTSL2
Source: MUXCON
Destination: BMUX, SETMUX, TAGMUX

These two signal select one of the two input address latches during a cycle. They are derived from zLATSW. During a snoop cycle, they get overridden by zSELSNP (see FIG. 15).

zSKNnn
Source: PCESA
Destination: RLS zSKNnn is a latched version of ySKNnn. It is used in deciding if the current line should be validated or invalidated. The first SKEN# that commits a line fill automatically (zCOMMIT and the first write-enable). The second SKEN# is sampled by RLS in creating rWR(STS,TAG,LRU).

zSNP
Source: PCESA
Destination: ADSCON, MUXCON, RLS, TAGACC

EADS# is latched by PCLK to generate zSNP. If zCSnn is present simultaneously, then zSNPCYC is created and the snoop is processed. FIG. 18 shows the relationship between all snoop-related signals. A chip-selected zSNP automatically stretches the current cycle by two clocks from the clock at which the EADS# occurred. If EADS# happened during idle bus, then it would create a two-clock cycle.

zSNPCYC
Source: MUXCON
Destination: BMUX, SETMUX, TAGMUX, RLS, TAGIFC

If a snoop is chip-selected, then zSNPCYC is generated in the following SACLK and lasts one full clock. It enables the input-address mux to let the snoop address through. See FIG. 15. If TAGIFC, it is used to enable the snoop latches to capture the outputs from the tag RAM in the next SHCLK so that a hit or miss can be determined. In RLS, it is used along with z(S,T,LS)MATCH to decide if the current line has been snooped out. zSNPCYC is also used to prevent the first snoop latch from capturing the address bus a clock after EADS#, so that the snoop address can be maintained for a potential snoop invalidation. See FIG. 18 for snoop timing.

zSNPHR
Source: TAGIFC
Destination: WAYCON

This is a tag hit signal from the right side of tag RAM captured at the first SHCLK after zSNPCYC (see FIG. 18). In conjunction with zSNPWAIT, it selects the way for snoop invalidation.

zSNPWAIT
Source: MUXCON
Destination: ADSCON, TAGACC, WAYCON

If a snoop look-up yields a hit, then zSNPWAIT is generated at the sampling SHCLK (see FIG. 18) and lasts for one full clock. It enables the tag RAM for one more clock so that the corresponding line can be invalidated. In ADSCON, zSNPWAIT is used in a redundant fashion to delay the start of a new cycle in response to an ADS#. It is redundant because if there is a snoop zINCYC will last long enough to cover the zSNPWAIT time period, and if zINCYC is active, then the next ADS# will be delayed anyway if it occurs when zINCYC is active. In TAGACC, it generates zWRLRU and zWRSTS commands that carry out the invalidation. In WAYCON, it creates zWAYSEL for proper way identification during the invalidation.

zSTARTnn
Source: START
Destination: MUXCON, PAD zSTARTnn drives xSTARTnn. Internally, it is used by MUXCON to generate the zCOMMIT signal. zSTARTnn is triggered off the hit signals from the tag RAM. It is also generated for all direct-processor write cycles.

zSTSACK

Source: TAGACC
Destination: RLS, MUXCON zSTSACK is generated at a SACLK if a write request from RLS (rWR(STS,TAG,LRU)) can be transformed into a tag access at that SACLK. zSTSACK will not be generated if the tag RAM will be busy at that clock with a snoop access.

zTAI[0–16]
Source: TAGMUX
Destination: TAGRAM

These are the tag address outputs of the input mux (FIG. 15). The polarity of zTAI is the opposite of xTAI. zLATSW selects which one of the two address latches will generate zTAI during normal cycles. During snoop, zSELSNP will select the snoop latch to generate zTAI.

zTFLSHnn
Source: PCESA
Destination: TAGRAM

The tag flush command is generated whenever there is a RESET or an external FLUSH# (zFLUSHnn internally). All the status bits are set to zero on zTFLSHnn. All pending write requests to the tag RAM are withdrawn if zFLUSHnn is sensed.

zVL0, zVL1, zVR0, zVR1
Source: TAGIFC
Destination: TAGRAM

These are status bits written into the tag RAM at every write request. The write-protect and LRU bit values are carried in zWPO and zPTRDAT, respectively. All the four values are computed each time. At any time only one line can be updated in any one way. The tag RAM uses zWAYSEL to decide which two of the four incoming valid signals should be used for an update. However, the control logic is responsible for correctly generating the status information for two signals selected by zWAYSEL. For the current line, the valid bit can be computed (rV). The valid information for the other line is obtained from the ADS latches (zADSV[LR][01]). If the other line is snooped out, then the appropriate ADS latches would have been reset by the rCLRV[LR] signals.

zWAYEN
Source: WAYCON
Destination: WE

The first write enable is generated by WE as soon as the first SKEN# is seen before the first transfer. The remaining three enables are generated by the trigger signals from RLS (r[TB]WE[AB]nn). zWAYEN acts as a cutoff signal to prevent the address mechanism that selects the first enable from affecting the subsequent transfers. zWAYEN is deactivated SKEN# or the first transfer (RDY# or BRDY#), whichever comes first. It is reactivated at the end of a cycle in preparation for the next cycle.

zWAYSEL, zIWAYSEL
Source: WAYCON
Destination: TAGIFC, TAGRAM

For any access to the tag RAM, zWAYSEL decides if it is to be on the left or right side. During normal cycles, zWAYSEL has a meaning only in a line fill where a line has to be selected for filling. The tag-hit signals are used in conjunction with the LRU bit to decide the value for zWAYSEL as shown in TABLE I.

On a snoop, if there is a hit (zADSHL or zADSHR will be a one), then zWAYSEL gets set accordingly for the duration of snoop. It will be returned to the value set by the cycle if a cycle was running when the snoop hit. zIWAYSEL is the same as zWAYSEL, a second signal being created for load reasons. In TAGIFC, zWAYSEL decides whether the status bits for a particular way should be recomputed or recirculated. In TAGRAM, it is used to select a way for updates.

zWESEL
Source: WAYCOM
Destination: RLS, WE

This is identical to zWAYSEL, except that the snoops will not determine the selection of a way once the way selection is determined at the beginning of a cycle by the hit/miss information. Only the tag RAM needs to know which way is being snooped out. For WE and RLS, the way information should remain constant throughout the cycle.

zWP
Source: PCESA
Destination: TAGIFC zWP is yWP captured at a PCLK. This forms the write-protect bit and produces zWPO which is written to the tag RAM.

zWPO
Source: TAGIFC
Destination: TAGRAM

This is the write-protect value to the tag RAM written at every zWRSTS command.

zWRSTS, zWRLRU, zWRTAG
Source: TAGACC
Destination: TAGRAM

The status bits (valid and write-protect), LRU and the tag bits are written at the selected set address when the corresponding write-command is active. The commands are overridden by zFLUSHnn.

zWRSCYC
Source: ADSCON
Destination: RLS, START, TAGACC, WE zWRSCYC is the same as zADSCYC except that it identifies the cycle as a direct-processor write cycle.

While the invention has been particularly shown and described with reference to preferred embodiments thereof, it will be understood by those skilled in the art that the foregoing and other changes in form and detail may be made therein without departing from the scope of the invention.

What is claimed is:

1. In a data processing system including
an input address bus;
a cache controller connected to said input address bus;
a cache data-array connected to said cache controller and to said input address bus;
said input address bus carrying a bus address;
control logic in said cache controller for controlling references to said cache data-array comprising:
a first address latch connected to said input address bus;
a second address latch connected to said input address bus;
clocking means for generating a first clock signal and a second clock signal;
first means connected to said clocking means, responsive to said first clock signal for capturing a current address on said input address bus into one of said first and second address latches at the beginning of a current cycle;
second means connected to said clocking means, responsive to said second clock signal for capturing a next address on said input address bus into the other one of said first and second address latches at the beginning of a next cycle;

said other one of said latches holding said next address until said current cycle ends;

third means connected to said first and second latches and to said clocking means for alternately selecting one of said first and second latches on successive cycles of said clocking means to thereby receive an input address at each successive clock cycle; and, fourth means connected to an output of said first address latch and to an output of said second address latch for gating of one of either said current address or said next address to said control logic.

2. The combination in accordance with claim 1 further comprising:

a snoop cycle signal line for signaling that a snoop address is on said address bus;

a first snoop latch connected to said input address bus and responsive to said snoop cycle signal line for storing said snoop address; and, a second snoop latch connected to said first snoop latch;

said clocking means including a third clock signal for transferring said snoop address in said first snoop latch to said second snoop latch;

said fourth means further including fifth means for gating one of said current address, said next address, or said snoop address to said control logic.

3. In a data processing system including an input address bus;

a cache controller connected to said input address bus;

a cache data-array connected to said cache controller and to said input address bus;

control logic in said cache controller for controlling references to said cache data-array including a first address latch, and a second address latch, the method comprising the steps of:

A. capturing a current address on said input address bus into one of said first or second address latches at the beginning of a current cycle;

B. capturing a next address on said input address bus into the other one of said first and second address latches at the beginning of a next cycle;

C. holding said current address until said current cycle ends;

D. alternately selecting one of said first and second latches on successive cycles of said clocking means to receive an input address at the successive clock cycles; and, E. gating one of either said current address or said next address to said control logic.

4. The method in accordance with claim 3 further comprising the steps of:

F. signaling that a snoop address is on said address bus;

G. storing said snoop address in a first snoop latch connected to said address bus in response to a first clock signal;

H. storing said snoop address in a second snoop latch connected to said first snoop latch in response to a second clock signal;

I. gating one of either said current address, said next address or said snoop address to said control logic.

* * * * *